US011463974B2

United States Patent
Li et al.

(10) Patent No.: US 11,463,974 B2
(45) Date of Patent: Oct. 4, 2022

(54) METHODS, SYSTEMS, APPARATUSES AND DEVICES FOR FACILITATING OPTIMIZING OF A NETWORK CONNECTION ESTABLISHED BETWEEN THE DEVICE AND ONE OR MORE SERVERS

(71) Applicants: Yuanjie Li, Mountain View, CA (US); Zengwen Yuan, Los Angeles, CA (US); Jinghao Zhao, Los Angeles, CA (US); Songwu Lu, Los Angeles, CA (US)

(72) Inventors: Yuanjie Li, Mountain View, CA (US); Zengwen Yuan, Los Angeles, CA (US); Jinghao Zhao, Los Angeles, CA (US); Songwu Lu, Los Angeles, CA (US)

(*) Notice: Subject to any disclaimer, the term of this patent is extended or adjusted under 35 U.S.C. 154(b) by 0 days.

(21) Appl. No.: 17/070,890

(22) Filed: Oct. 14, 2020

(65) Prior Publication Data

US 2021/0112509 A1   Apr. 15, 2021

Related U.S. Application Data

(60) Provisional application No. 62/914,620, filed on Oct. 14, 2019.

(51) Int. Cl.
*H04W 56/00* (2009.01)
*H04W 52/02* (2009.01)
(Continued)

(52) U.S. Cl.
CPC ........ *H04W 56/002* (2013.01); *H04B 17/318* (2015.01); *H04W 52/0206* (2013.01); *H04W 74/002* (2013.01); *H04W 84/18* (2013.01)

(58) Field of Classification Search
CPC .. H04B 17/318; H04B 17/309; H04B 17/373; H04W 24/08; H04W 84/12; H04W 84/18;
(Continued)

(56) References Cited

U.S. PATENT DOCUMENTS 7,680,038 B1   3/2010   Gourlay
8,917,607 B2 * 12/2014   Kakadia ................. H04L 45/26
                                                   370/237
(Continued)

*Primary Examiner* — Peter Chen

(57) ABSTRACT

Disclosed is a device for facilitating optimizing of a network connection established between the device and one or more servers through at least one network. Further, the device comprises at least one network connection interface configured for establishing the network connection with the one or more servers. Further, the device comprises at least one monitor configured for collecting at least one network information associated with the at least one network connection interface. Further, the device comprises at least one optimizer communicatively coupled with the at least one monitor. Further, the at least one optimizer is configured for profiling each frequency channel of a plurality of frequency channels associated with the at least one network connection interface, determining at least one optimal frequency channel of the plurality of frequency channels based on the profiling and determining at least one optimal communication layer parameter of at least one communication layer based on the profiling.

18 Claims, 34 Drawing Sheets

(51) Int. Cl.
*H04W 74/00* (2009.01)
*H04B 17/318* (2015.01)
*H04W 84/18* (2009.01)

(58) Field of Classification Search
CPC ............. H04W 28/0236; H04W 76/10; H04W 74/002; H04W 52/0206; H04W 56/001; H04W 56/002; H04W 72/1205; H04W 72/1221; H04W 72/1226; H04W 72/1231; H04W 72/1236; H04W 72/1252
See application file for complete search history.

(56) References Cited

U.S. PATENT DOCUMENTS

| | | |
|---|---|---|
| 9,056,252 B2 | 6/2015 | Shah |
| 9,094,080 B1 * | 7/2015 | Xu ..................... H04L 25/0212 |
| 2011/0212773 A1 | 9/2011 | Hjelm |

* cited by examiner

| NOTATION | EXPLANATION |
|---|---|
| RSRP | REFERENCE SIGNAL RECEIVED POWER |
| RSRQ | REFERENCE SIGNAL RECEIVED QUALITY |
| RSSI | REFERENCE SIGNAL STRENGTH INDICATOR |
| $\eta \in [0,1]$ | RATIO TRAFFIC LOAD (I.E., % OF OFDM RESOURCE BLOCKS THAT HAVE BEEN ALLOCATED) |
| $N_{rb}$ | NUMBER OF DOWNLINK OFDM RESOURCE BLOCKS |
| $N_{subc}$ | NUMBER OF RESOURCE ELEMENTS IN EACH OFDM RESOURCE BLOCK |
| $N_{ref}$ | NUMBER OF RESOURCE ELEMENTS OCCUPIED BY THE REFERENCE SIGNALS |
| $N_{ant}$ | NUMBER OF ANTENNAS IN THE MOBILE CLIENT |
| $B^i$ | ESTIMATED AVAILABLE WIRELESS BANDWIDTH FOR CHANNEL I |
| $L^i$ | ESTIMATED AVAILABLE LATENCY SCORE FOR CHANNEL I |
| $t^i$ | LATENCY MEASUREMENT BY ACTIVE NETWORK PROBE (VIA PING OR TCPING) |

FIG. 23

| DOWNLIN CHANNEL BANDWIDTH (MH$_z$) | NUMBER OF DOWNLINK OFDM RESOURCE BLOCKS N$_{rb}$ |
|---|---|
| 1.4 | 6 |
| 3 | 15 |
| 5 | 25 |
| 10 | 50 |
| 15 | 75 |
| 20 | 100 |

METHODS, SYSTEMS, APPARATUSES AND DEVICES FOR FACILITATING OPTIMIZING OF A NETWORK CONNECTION ESTABLISHED BETWEEN THE DEVICE AND ONE OR MORE SERVERS

The current application claims a priority to the U.S. Provisional Patent application Ser. No. 62/914,620 filed on Oct. 14, 2019.

FIELD OF THE INVENTION

Generally, the present disclosure relates to the field of data processing. More specifically, the present disclosure relates to methods, systems, apparatuses and devices for facilitating optimizing of a network connection established between the device and one or more servers.

BACKGROUND OF THE INVENTION

Online mobile games (such as cloud gaming, and massively multiplayer online role-playing games) are becoming a killer application for smartphones. Most users play the online games with their smartphones over cellular networks (such as 4G LTE, upcoming 5G and beyond). Since 2017, there have been 200 million monthly active mobile online game players in China. Most users play the online mobile games with their smartphones over cellular networks (4G LTE, upcoming 5G and beyond). Further, the cellular networks are the largest wireless infrastructure that offers "anytime, anywhere" Internet. Compared with Wi-Fi, the cellular networks enable the ubiquitous indoor/outdoor coverage, and supports seamless mobility in large areas. For the online mobile game, the major latency bottleneck comes from the network latency, particularly the wireless latency from the cellular networks. Further, the cellular networks do not provide sub-100 ms latency guarantee for games, especially in the congested areas, outdoor environments, or highly-mobile environments. Existing solutions for mitigating the network latency in the online mobile games mainly span on two dimensions. On the cellular network infrastructure side, the cellular network operators can allocate more physical resources (such as 5G) or performing QoS-aware scheduling (such as Tencent™ Intelligent Network Optimization that requests the dedicated, high-QoS session for its player control data). However, these infrastructure-side solutions do not fulfill the potentials of latency reduction, since they are unaware of the client-side game traffic characteristics and smartphone behaviors. On the mobile client side, existing solutions that focus on optimizing the transport-layer protocols and game control synchronization do not fully optimize the wireless communications on the client.

Therefore, there is a need for improved methods, systems, apparatuses and devices for facilitating optimizing of a network connection established between the device and one or more servers that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a device for facilitating optimizing of a network connection established between the device and one or more servers through at least one network is disclosed. Further, the device may include at least one network connection interface configured for establishing the network connection with the one or more servers. Further, the device may include at least one monitor configured for collecting at least one network information associated with the network connection from the at least one network connection interface. Further, the device may include at least one optimizer communicatively coupled with the at least one monitor. Further, the at least one optimizer may be configured for profiling each frequency channel of a plurality of frequency channels associated with the at least one network connection interface based on the collecting. Further, the at least one network connection interface establishes the network connection using at least one frequency channel of the plurality of frequency channels and at least one communication layer parameter of at least one communication layer associated with the at least one network connection interface. Further, the at least one optimizer may be configured for determining at least one optimal frequency channel of the plurality of frequency channels based on the profiling. Further, the at least one optimizer may be configured for determining at least one optimal communication layer parameter of the at least one communication layer based on the profiling. Further, the at least one network connection interface may be configured for establishing the network connection using the at least one optimal frequency channel and the at least one optimal communication layer parameter.

According to some embodiments, a device for facilitating optimizing of a network connection established between the device and one or more servers through at least one network is disclosed. Further, the device may include at least one network connection interface configured for establishing the network connection with the one or more servers. Further, the device may include at least one monitor configured for collecting at least one network information associated with the network connection from the at least one network connection interface. Further, the device may include at least one optimizer communicatively coupled with the at least one monitor. Further, the at least one optimizer may be configured for profiling each frequency channel of a plurality of frequency channels associated with the at least one network connection interface based on the collecting. Further, the at least one network connection interface may establish the network connection using at least one frequency channel of the plurality of frequency channels and at least one communication layer parameter of at least one communication layer associated with the at least one network connection interface. Further, the at least one optimizer may be configured for determining at least one optimal frequency channel of the plurality of frequency channels based on the profiling. Further, the at least one optimizer may be configured for determining at least one optimal communication layer parameter of the at least one communication layer based on the profiling. Further, the at least one network connection interface may be configured for establishing the network connection using the at least one optimal frequency channel and the at least one optimal communication layer parameter. Further, the device may include at least one post-optimization processing unit communicatively coupled with the at least one optimizer. Further, the at least one post-optimization processing unit may be configured for receiving at least one first network performance metric associated with the network connection established using the at least one frequency channel and the at least one communication layer parameter from the at least one network connection interface. Further, the at least one post-optimization processing unit may be configured for receiving at least one second network performance metric associated with the network connection established using the at least one optimal frequency channel and the at least one optimal communication layer parameter from the at least one network connection interface. Further, the at least one post-optimization processing unit may be configured for analyzing the at least one first network performance metric and the at least one second network performance metric. Further, the at least one post-optimization processing unit may be configured for determining an optimization of the network connection based on the analyzing. Further, the at least one network connection interface may be configured for modifying the network connection based on the determining of the optimization.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 23 is a notation table including the description of the notations used in the present disclosure.

DETAIL DESCRIPTIONS OF THE INVENTION

Figure 1:
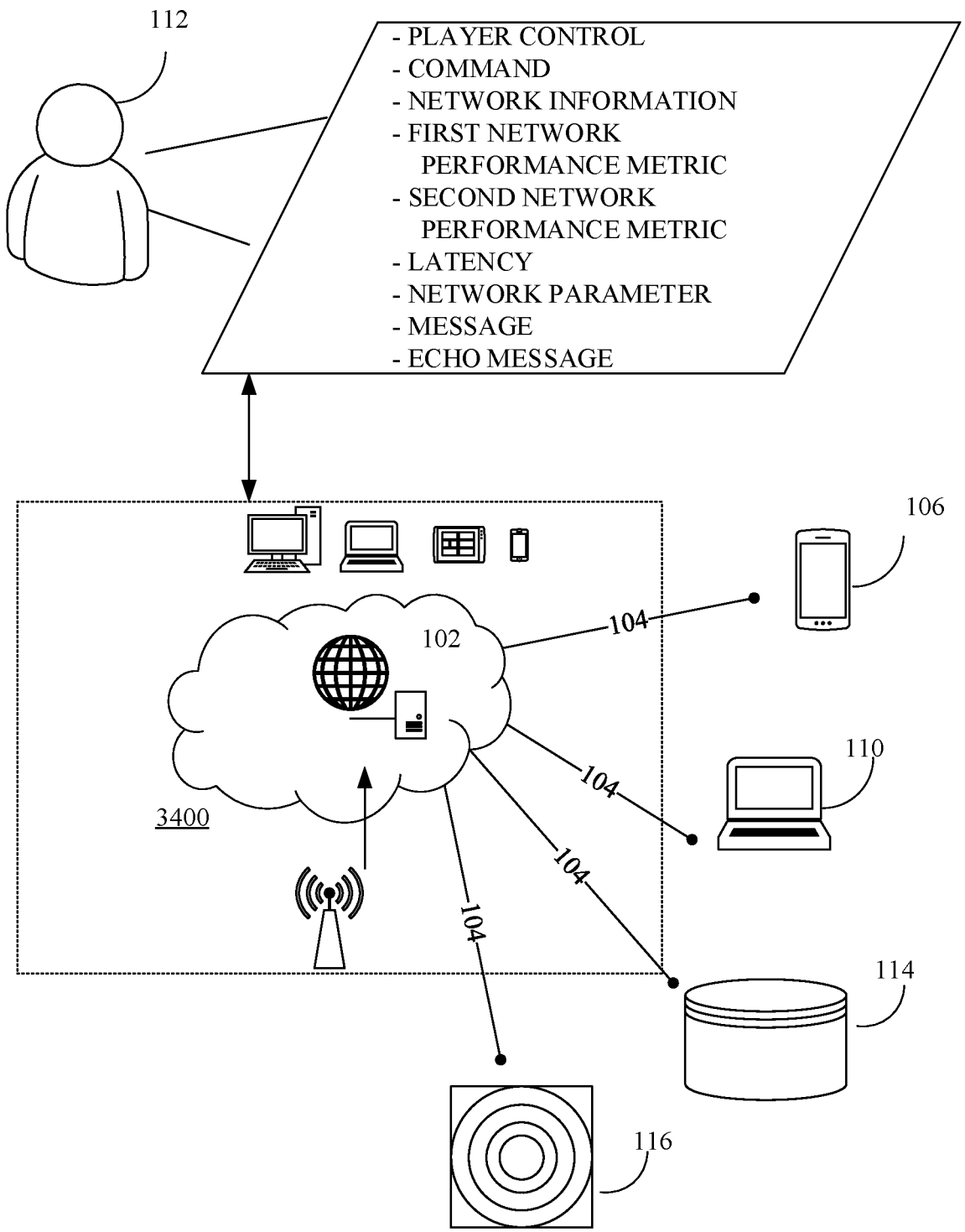
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of optimizing of a network connection established between the device and one or more servers, embodiments of the present disclosure are not limited to use only in this context.

Overview:

According to some embodiments, systems and methods to facilitate cellular network optimization for an online game over a client-driven network are disclosed.

According to some embodiments, a system to facilitate cellular network optimization for an online game over a client-driven network is disclosed. Further, the system may be implemented inside the mobile clients (e.g., smartphones, mobile game consoles, pads, etc.) as a background system application, and composes of three components: The monitors, the optimizers, and the post-optimization processing units. The monitors collect the runtime information about the wireless characteristics and network performance statistics to facilitate the optimization decision. They may include a passive network information monitor and an active network performance probe. The passive network information monitor collects the runtime wireless qualities, configurations, and performance metrics. The active network probe actively probes the end-to-end network latencies by emulating the game traffic with ping/TCPing.

Further, the optimizers accept the network information from the monitors, decides the optimal network configurations on the client, and executes the client optimization. The optimizers may include four sub-modules: (1) The bandwidth estimator, which profiles each wireless channels (such as EARFCN in 4G LTE) with their estimated bandwidth; (2) The latency estimator, which profiles each wireless channels (such as EARFCN in 4G LTE) with their estimated end-to-end game latency; (3) The frequency band optimizer, which leverages the bandwidth/latency estimation to select the optimal wireless channel combinations to optimize the physical-layer network performance; and (4) The TCP/IP optimizer, which leverages the bandwidth/latency estimation to optimize the transport-layer configurations. The post-optimization processing units ensure that the optimization is correctly and successfully performed. It composes of two sub-modules: (1) a rollback module that, in presence of optimization failures or dynamic performance degrade, rollbacks the client-side network configurations to the default setting before the optimization; and (2) a re-optimization module that adapts the configurations to the dynamic wireless and mobile network environments.

Further, the present disclosure describes a computer-implemented system and method of client-driven cellular network optimization for the online mobile games. To improve the probability of ≤100 ms end-to-end latency, it leverages the client-side, full-stack network information to perform the cross-layer optimizations (from physical to TCP/IP layers). Further, the present disclosure further provides multiple modes for different types of online mobile games, such as cloud gaming and massively multiplayer online role-playing game.

FIG. 1 is an illustration of an online platform 100 consistent with various embodiments of the present disclosure. By way of non-limiting example, the online platform 100 to facilitate optimizing of a network connection established between the device and one or more servers may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, game players, gaming server providers, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 3400.

Figure 2:
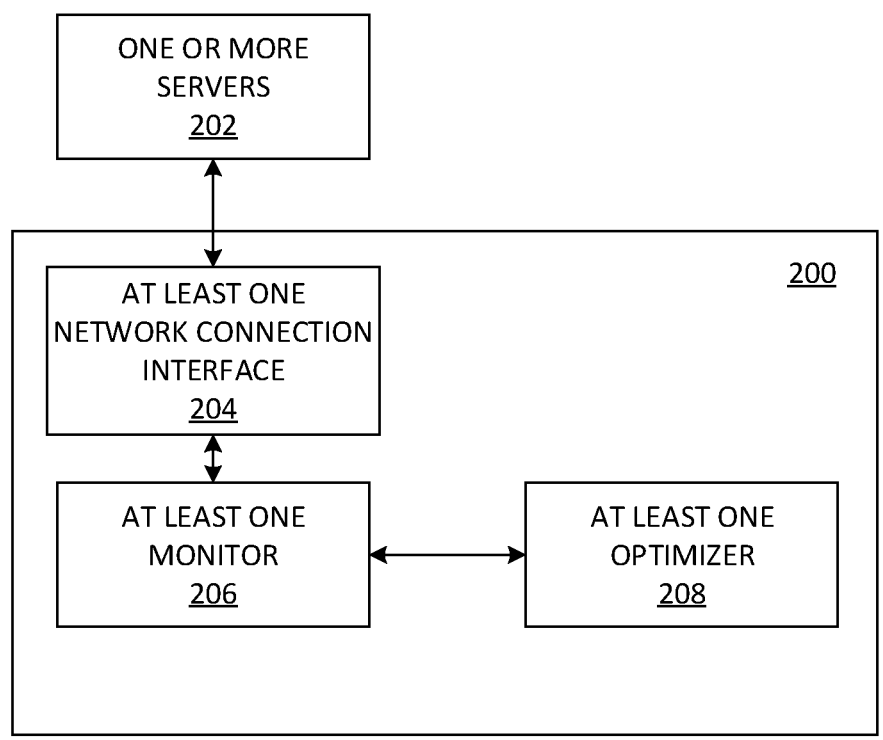
FIG. 2 is a block diagram of a device to facilitate optimizing of a network connection established between the device and one or more servers, in accordance with some embodiments.

FIG. 2 is a block diagram of a device 200 to facilitate optimizing of a network connection established between the device 200 and one or more servers 202 through at least one network, in accordance with some embodiments. Further, the device 200 may include at least one network connection interface 204 configured for establishing the network connection with the one or more servers 202.

Further, the device 200 may include at least one monitor 206 configured for collecting at least one network information associated with the network connection from the at least one network connection interface 204.

Further, the device 200 may include at least one optimizer 208 communicatively coupled with the at least one monitor 206. Further, the at least one optimizer 208 may be configured for profiling each frequency channel of a plurality of frequency channels associated with the at least one network connection interface 204 based on the collecting.

Further, the at least one network connection interface 204 may establish the network connection using at least one frequency channel of the plurality of frequency channels and at least one communication layer parameter of at least one communication layer associated with the at least one network connection interface 204.

According to some embodiments, the profiling may include estimating at least one of a bandwidth and a latency for the each frequency channel of the plurality of frequency channels.

Further, the at least one optimizer 208 may be configured for determining at least one optimal frequency channel of the plurality of frequency channels based on the profiling.

Further, the at least one optimizer 208 may be configured for determining at least one optimal communication layer parameter of the at least one communication layer based on the profiling. Further, the at least one network connection interface 204 may be configured for establishing the network connection using the at least one optimal frequency channel and the at least one optimal communication layer parameter.

Figure 3:
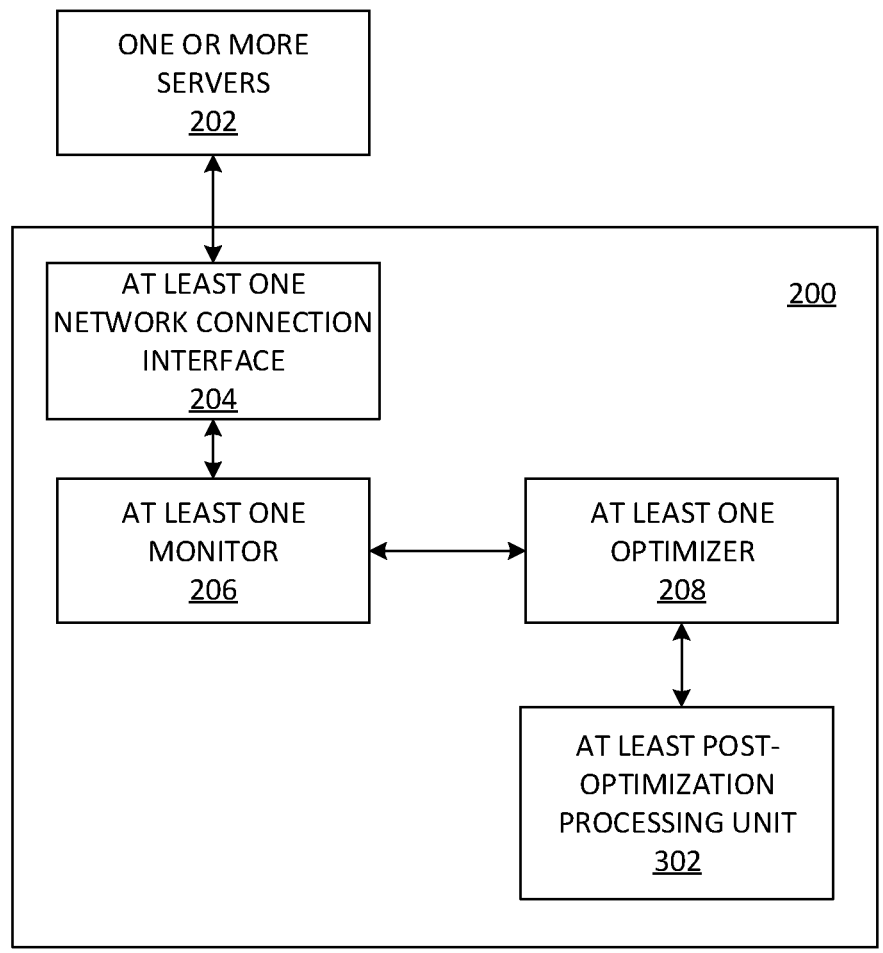
FIG. 3 is a block diagram of the device to facilitate optimizing of a network connection established between the device and one or more servers, in accordance with further embodiments.

FIG. 3 is a block diagram of the device 200 to facilitate optimizing of a network connection established between the device 200 and the one or more servers 202, in accordance with further embodiments. Further, the device 200 may include at least one post-optimization processing unit 302 communicatively coupled with the at least one optimizer 208. Further, the at least one post-optimization processing unit 302 may be configured for receiving at least one first network performance metric associated with the network connection established using the at least one frequency channel and the at least one communication layer parameter from the at least one network connection interface 204.

Further, the at least one post-optimization processing unit 302 may be configured for receiving at least one second network performance metric associated with the network connection established using the at least one optimal frequency channel and the at least one optimal communication layer parameter from the at least one network connection interface 204.

Further, the at least one post-optimization processing unit 302 may be configured for analyzing the at least one first network performance metric and the at least one second network performance metric.

Figure 4:
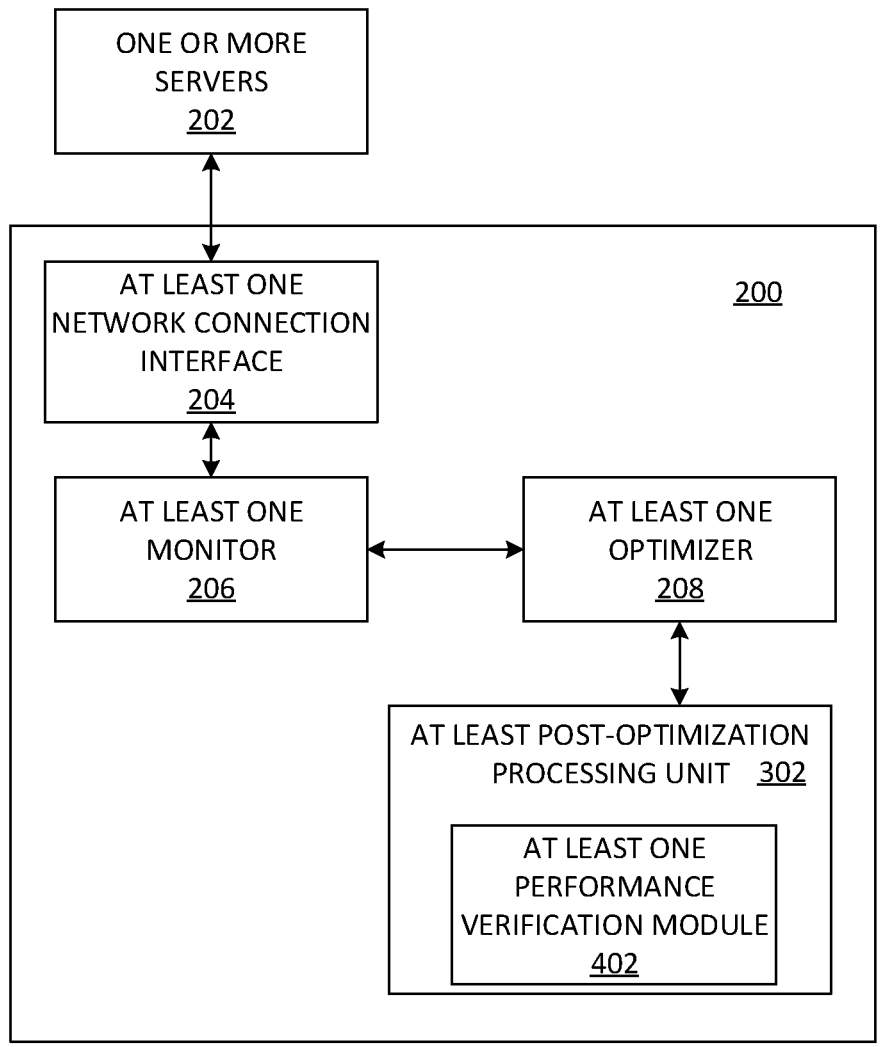
FIG. 4 is a block diagram of the device to facilitate optimizing of a network connection established between the device and one or more servers, in accordance with further embodiments.

Further, the at least one post-optimization processing unit 302 may be configured for determining an optimization of the network connection based on the analyzing. Further, the at least one network connection interface 204 may be configured for modifying the network connection based on the determining of the optimization FIG. 4 is a block diagram of the device 200 to facilitate optimizing of a network connection established between the device 200 and the one or more servers 202, in accordance with further embodiments.

Further, the at least one post-optimization processing unit 302 may include at least one performance verification module 402. Further, the at least one performance verification module 402 may be configured for performing at least one ping for the one or more servers 202 using the at least one network connection interface 204.

Further, the at least one performance verification module 402 may be configured for determining at least one latency corresponding to the at least one ping based on the performing. In some embodiments, the at least one latency may be a round trip latency.

Further, the at least one performance verification module 402 may be configured for storing the at least one latency.

Figure 5:
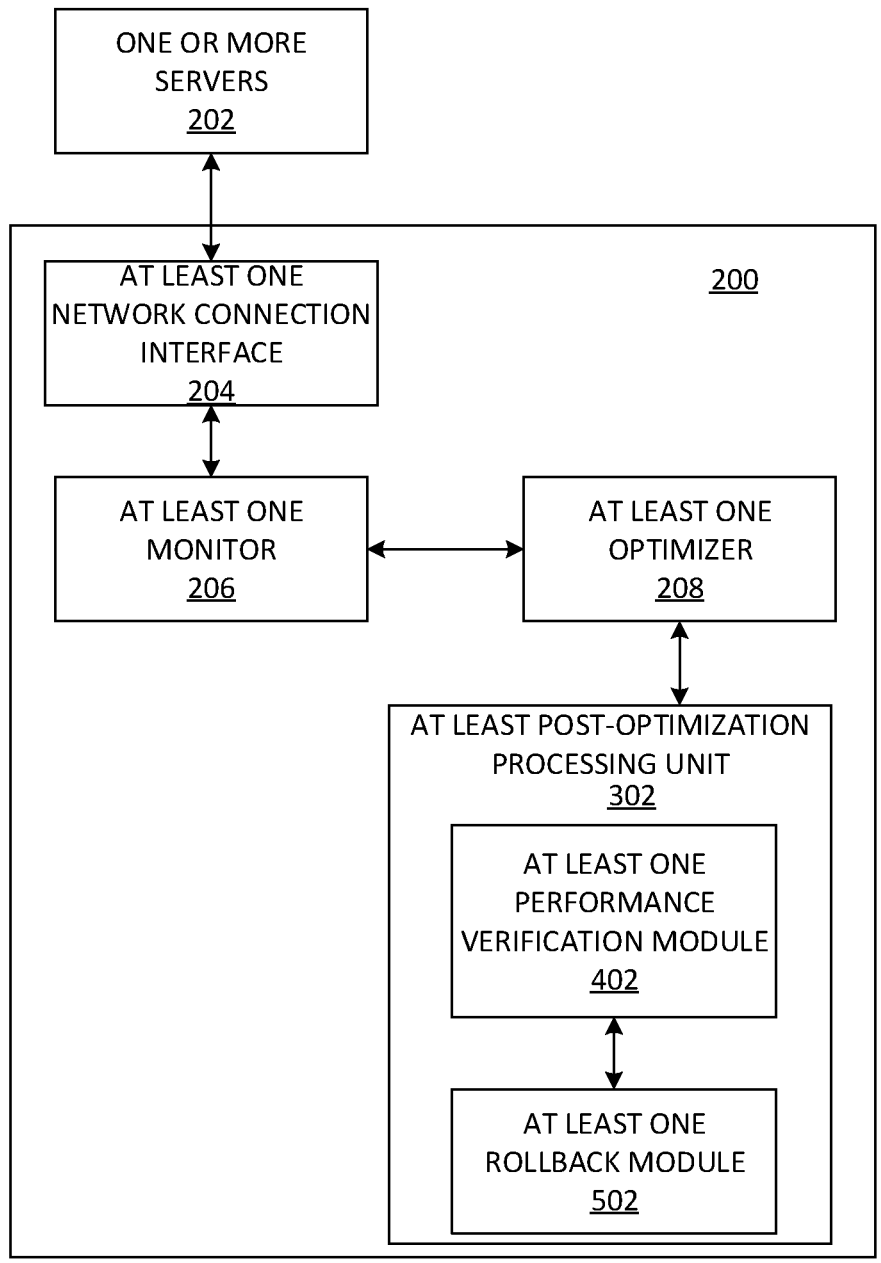
FIG. 5 is a block diagram of the device to facilitate optimizing of a network connection established between the device and one or more servers, in accordance with further embodiments.

FIG. 5 is a block diagram of the device 200 to facilitate optimizing of a network connection established between the device 200 and the one or more servers 202, in accordance with further embodiments.

Further, the at least one post-optimization processing unit 302 may include at least one rollback module 502 communicatively coupled with the at least one performance verification module 402.

Further, the at least one rollback module 502 may be configured for analyzing the at least one latency associated with the at least one optimal frequency channel.

Further, the at least one rollback module 502 may be configured for determining a rollback condition for the at least one communication layer based on the analyzing.

Further, the at least one rollback module 502 may be configured for replacing the at least one optimal communication layer parameter with the at least one communication layer parameter for the at least one communication layer based on the determining. Further, the at least one network connection interface 204 may be configured for establishing the network connection using the at least one optimal frequency channel and the at least one communication layer parameter of the at least one communication layer based on the rollback condition.

Figure 6:
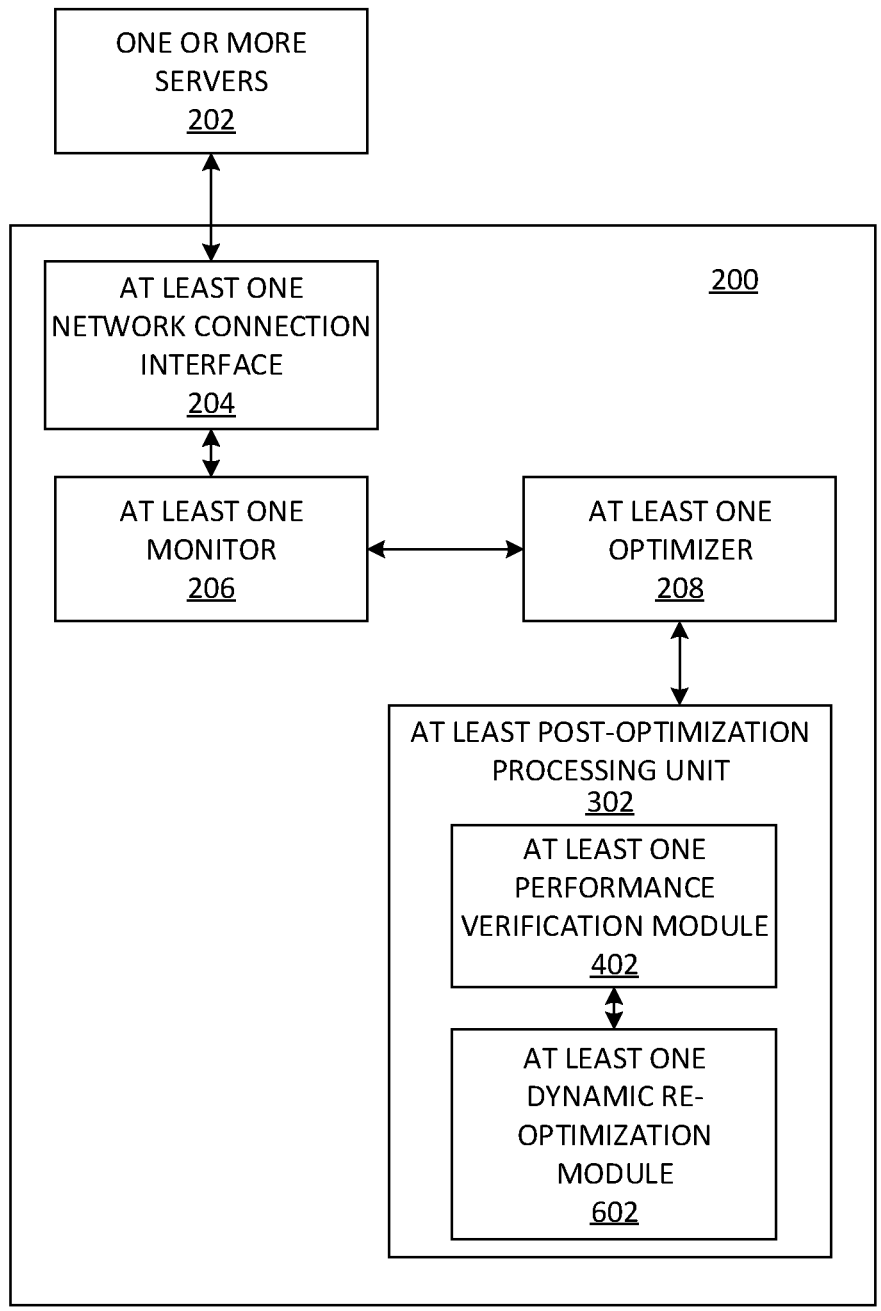
FIG. 6 is a block diagram of the device to facilitate optimizing of a network connection established between the device and one or more servers, in accordance with further embodiments.

FIG. 6 is a block diagram of the device 200 to facilitate optimizing of a network connection established between the device 200 and the one or more servers 202, in accordance with further embodiments. Further, the at least one post-optimization processing unit 302 may include at least one dynamic re-optimization module 602 communicatively coupled with the at least one performance verification module 402.

Further, the at least one dynamic re-optimization module 602 may be configured for reading the at least one latency corresponding to the at least one ping. Further, each latency may be read after a time interval.

Further, the at least one dynamic re-optimization module 602 may be configured for calculating an exponential moving window average (EMWA) of the at least one latency based on the reading.

Further, the at least one dynamic re-optimization module 602 may be configured for comparing the EMWA with a predetermined latency based on the calculating.

Further, the at least one dynamic re-optimization module 602 may be configured for scheduling an optimization task for the at least one optimizer 208 based on the comparing.

Further, at least one of the determining of the at least one optimal frequency channel and the determining of the at least one optimal communication layer parameter may be based on the scheduling.

Figure 7:
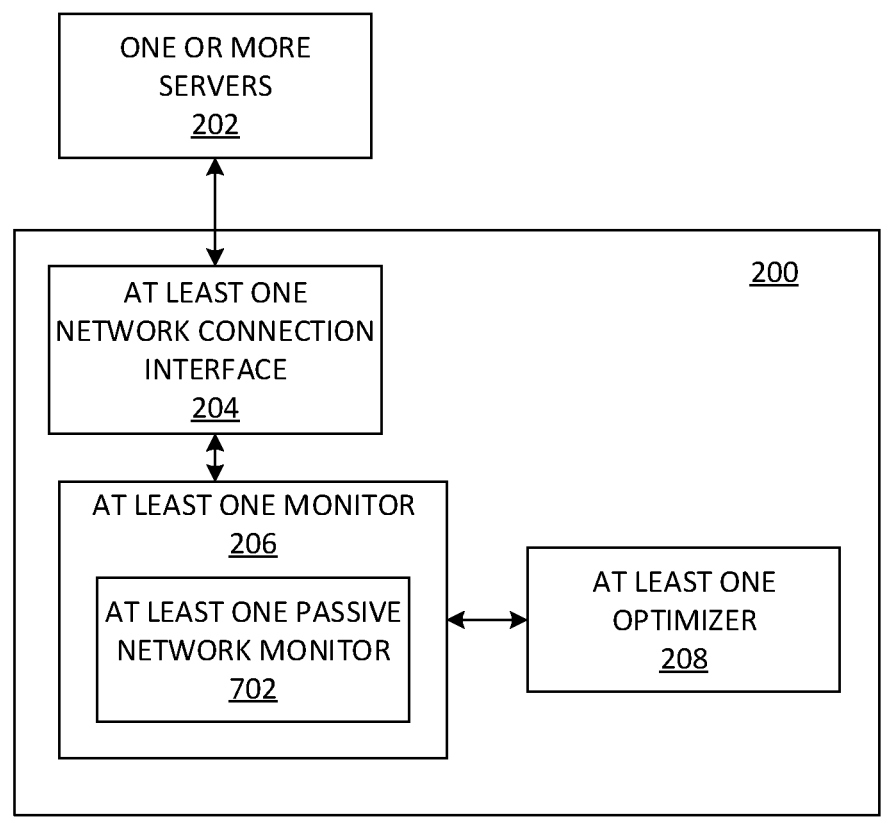
FIG. 7 is a block diagram of the device to facilitate optimizing of a network connection established between the device and one or more servers, in accordance with further embodiments.

FIG. 7 is a block diagram of the device 200 to facilitate optimizing of a network connection established between the device 200 and the one or more servers 202, in accordance with further embodiments. Further, the at least one monitor 206 may include at least one passive network monitor 702. Further, the at least one passive network monitor 702 may be configured for issuing at least one command to at least one virtual device of the device 200. Further, the at least one passive network monitor 702 may be configured for extracting at least one network parameter of the each frequency channel from the at least one virtual device based on the issuing. Further, the at least one network information may include the at least one network parameter.

Figure 8:
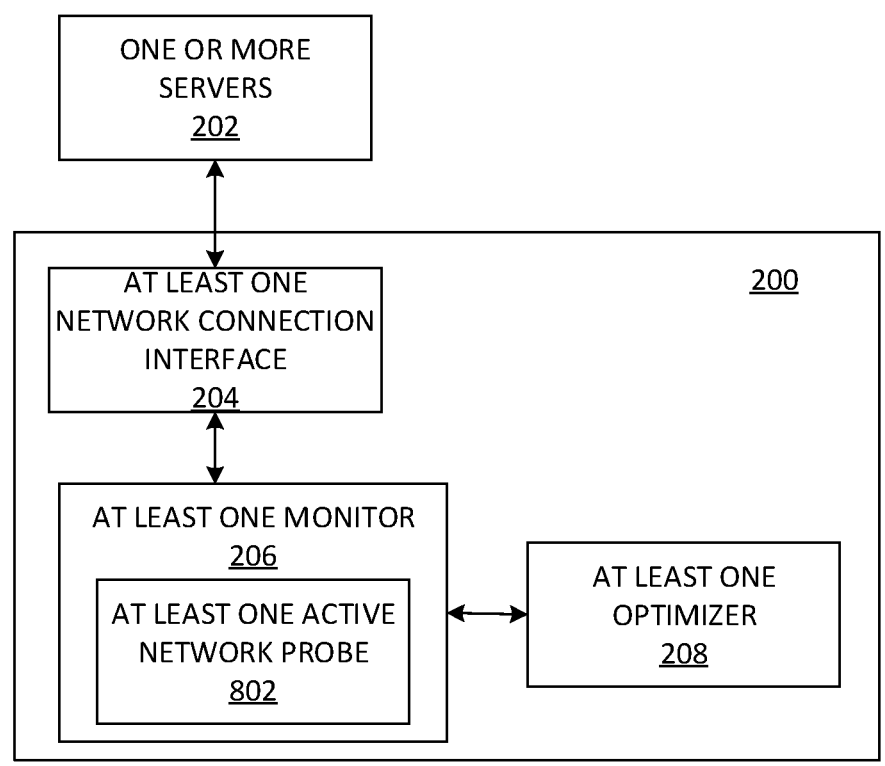
FIG. 8 is a block diagram of the device to facilitate optimizing of a network connection established between the device and one or more servers, in accordance with further embodiments.

FIG. 8 is a block diagram of the device 200 to facilitate optimizing of a network connection established between the device 200 and the one or more servers 202, in accordance with further embodiments. Further, the at least one monitor 206 may include at least one active network probe 802.

Further, the at least one passive network probe 802 may be configured for transmitting at least one message to the one or more servers 202 using the at least one network connection interface 204 via at least one ping. Further, each message of the at least one message may be characterized by a packet size and an inter-packet interval for emulating an application traffic generated by an application executed on the device 200. Further, the each message may include a timestamp.

Further, the at least one passive network probe 802 may be configured for receiving at least one echo message from the one or more servers 202 based on the transmitting of the at least one message.

Further, the at least one passive network probe 802 may be configured for analyzing the at least one message and the at least one echo message.

Further, the at least one passive network probe 802 may be configured for generating at least one end-to-end latency measurement based on the analyzing.

Further, the at least one passive network probe 802 may be configured for generating at least one of an average of the at least one end-to-end latency measurement and a standard deviation of the at least one end-to-end latency measurement based on the generating of the at least one end-to-end latency measurement. Further, the at least one network information may include at least one of the at least one end-to-end latency measurement, the at least one of the average of the at least one end-to-end latency measurement, and the standard deviation of the at least one end-to-end latency measurement.

Figure 9:
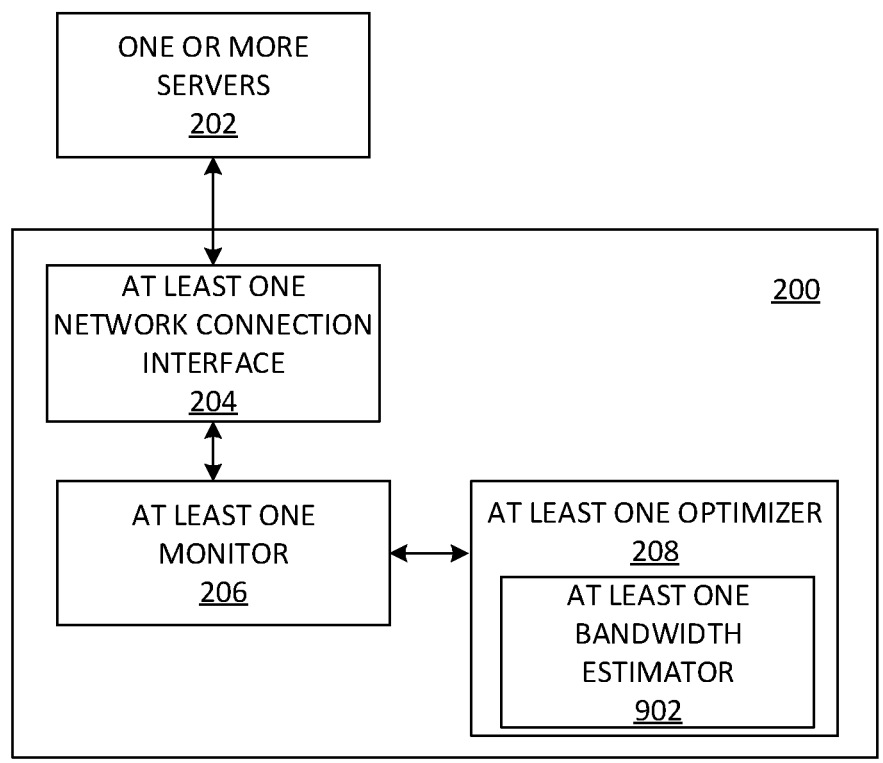
FIG. 9 is a block diagram of the device to facilitate optimizing of a network connection established between the device and one or more servers, in accordance with further embodiments.

FIG. 9 is a block diagram of the device 200 to facilitate optimizing of a network connection established between the device 200 and the one or more servers 202, in accordance with further embodiments.

Further, the at least one network information may include at least one channel information associated with the each frequency channel. Further, the at least one optimizer 208 may include at least one bandwidth estimator 902. Further, the at least one bandwidth estimator 902 may be configured for analyzing at least one channel information.

In some embodiments, the at least one channel information may include a number of available resource blocks associated with the each frequency channel, a number of resource elements in each available resource block, a number of resource elements occupied by the reference signals, a number of antennas in the device 200.

Further, the at least one bandwidth estimator 902 may be configured for determining a bandwidth of the each frequency channel based on the analyzing.

Further, the at least one bandwidth estimator 902 may be configured for generating a bandwidth index for the each frequency channel based on the determining. Further, at least one of the determining of the at least one optimal frequency channel and the determining of the at least one optimal communication layer parameter may be based on the generating.

Figure 10:
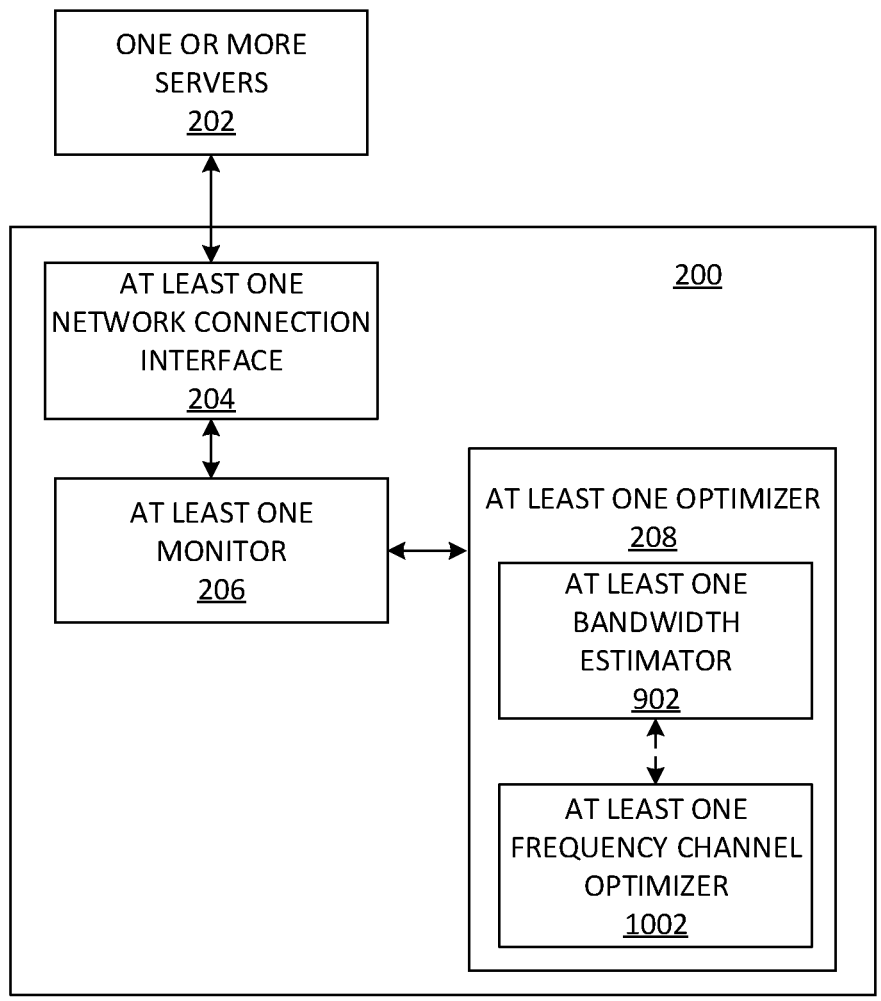
FIG. 10 is a block diagram of the device to facilitate optimizing of a network connection established between the device and one or more servers, in accordance with further embodiments.

FIG. 10 is a block diagram of the device 200 to facilitate optimizing of a network connection established between the device 200 and the one or more servers 202, in accordance with further embodiments. Further, the at least one network information may include at least one application information associated with at least one application executed on the device 200.

Further, the at least one optimizer 208 may include at least one frequency channel optimizer 1002. Further, the at least one frequency channel optimizer 1002 may be configured for analyzing the at least one application information.

Further, the at least one frequency channel optimizer 1002 may be configured for determining at least one bandwidth requirement for the at least one application based on the analyzing.

Further, the at least one frequency channel optimizer 1002 may be configured for selecting at least one primary frequency channel of the plurality of frequency channels based on the determining of the at least one bandwidth requirement. Further, each primary frequency channel of the at least one primary frequency channel may be characterized by the bandwidth index. Further, the determining of the at least one optimal frequency channel may be based on the selecting.

Figure 11:
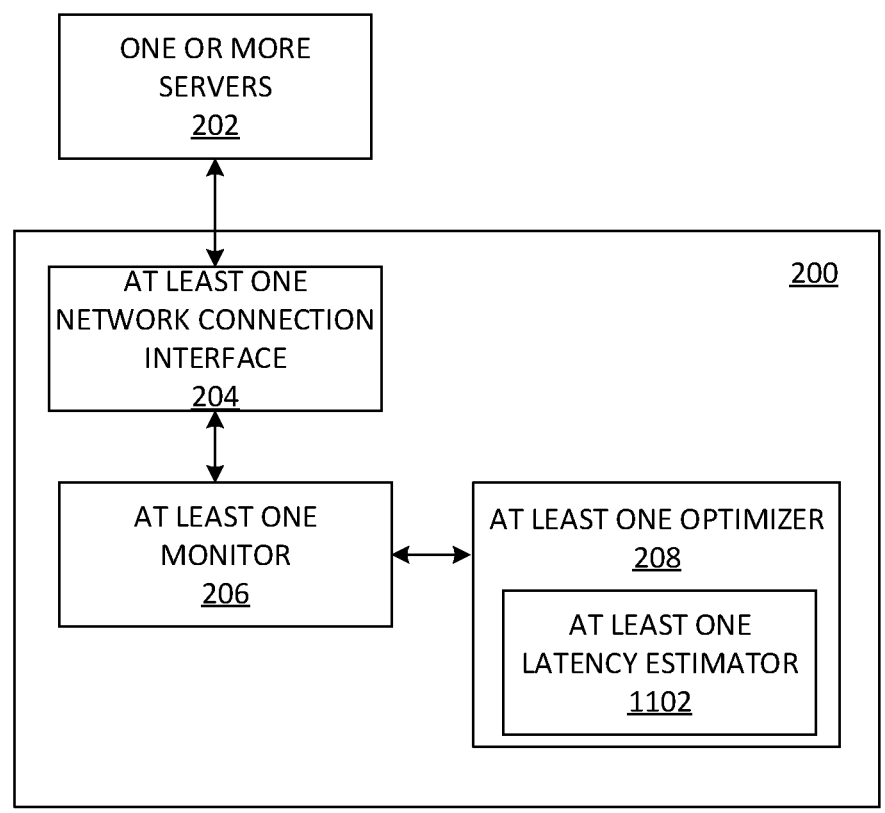
FIG. 11 is a block diagram of the device to facilitate optimizing of a network connection established between the device and one or more servers, in accordance with further embodiments.

FIG. 11 is a block diagram of the device 200 to facilitate optimizing of a network connection established between the device 200 and the one or more servers 202, in accordance with further embodiments. Further, the at least one network information may include at least channel measurement associated with the each frequency channel. Further, the at least one optimizer 208 may include at least one latency estimator 1102.

Further, the at least one latency estimator 1102 may be configured for analyzing the at least one channel measurement. In some embodiments, the at least one channel measurement may include the at least one end-to-end latency measurement, the at least one of the average of the at least one end-to-end latency measurement, and the standard deviation of the at least one end-to-end latency measurement associated with the each frequency channel.

Further, the at least one latency estimator 1102 may be configured for determining a latency associated with the each frequency channel based on the analyzing.

Further, the at least one latency estimator 1102 may be configured for generating a latency score for the each frequency channel based on the determining. Further, at least one of the determining of the at least one optimal frequency channel and the determining of the at least one optimal communication layer parameter may be based on the generating.

Figure 12:
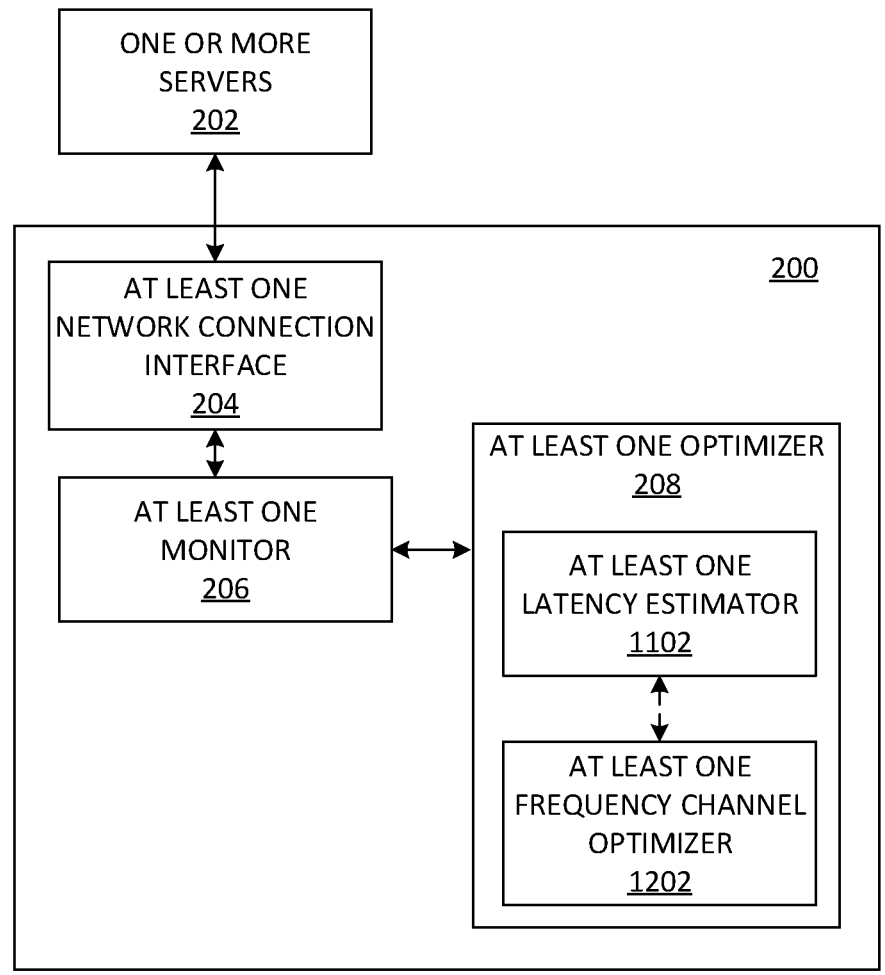
FIG. 12 is a block diagram of the device to facilitate optimizing of a network connection established between the device and one or more servers, in accordance with further embodiments.

FIG. 12 is a block diagram of the device 200 to facilitate optimizing of a network connection established between the device 200 and the one or more servers 202, in accordance with further embodiments. Further, the at least one network information may include at least one application information associated with at least one application executed on the device 200. Further, the at least one optimizer 208 may include at least one frequency channel optimizer 1202.

Further, the at least one frequency channel optimizer 1202 may be configured for analyzing the at least one application information.

Further, the at least one frequency channel optimizer 1202 may be configured for determining at least one latency requirement for the at least one application based on the analyzing.

Further, the at least one frequency channel optimizer 1202 may be configured for selecting at least one primary frequency channel of the plurality of frequency channels based on the determining of the at least one latency requirement. Further, each primary frequency channel of the at least one primary frequency channel may be characterized by the latency score. Further, the determining of the at least one optimal frequency channel may be based on the selecting.

Figure 13:
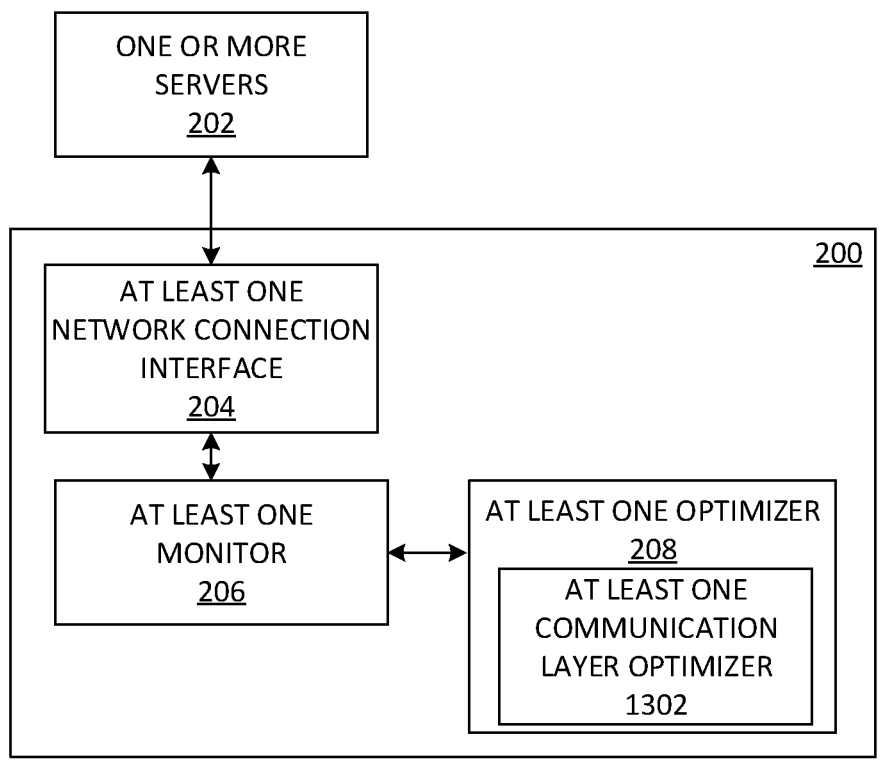
FIG. 13 is a block diagram of the device to facilitate optimizing of a network connection established between the device and one or more servers, in accordance with further embodiments.

FIG. 13 is a block diagram of the device 200 to facilitate optimizing of a network connection established between the device 200 and the one or more servers 202, in accordance with further embodiments. Further, the at least one optimizer 208 may include at least one communication layer optimizer 1302.

Further, the at least one communication layer optimizer 1302 may be configured for analyzing the bandwidth associated with the each frequency channel and the latency associated with the each frequency channel. In some embodiments, the analyzing may include comparing at least one of the bandwidth with a bandwidth threshold and the latency with a latency threshold.

Further, the at least one communication layer optimizer 1302 may be configured for configuring the at least one communication layer parameter based on the analyzing. Further, the determining of the at least one optimal communication layer parameter of the at least one communication layer may be based on the configuring. In some embodiments, the configuring may include multiplying the at least one communication layer parameter with at least one predetermined ratio.

Figure 14:
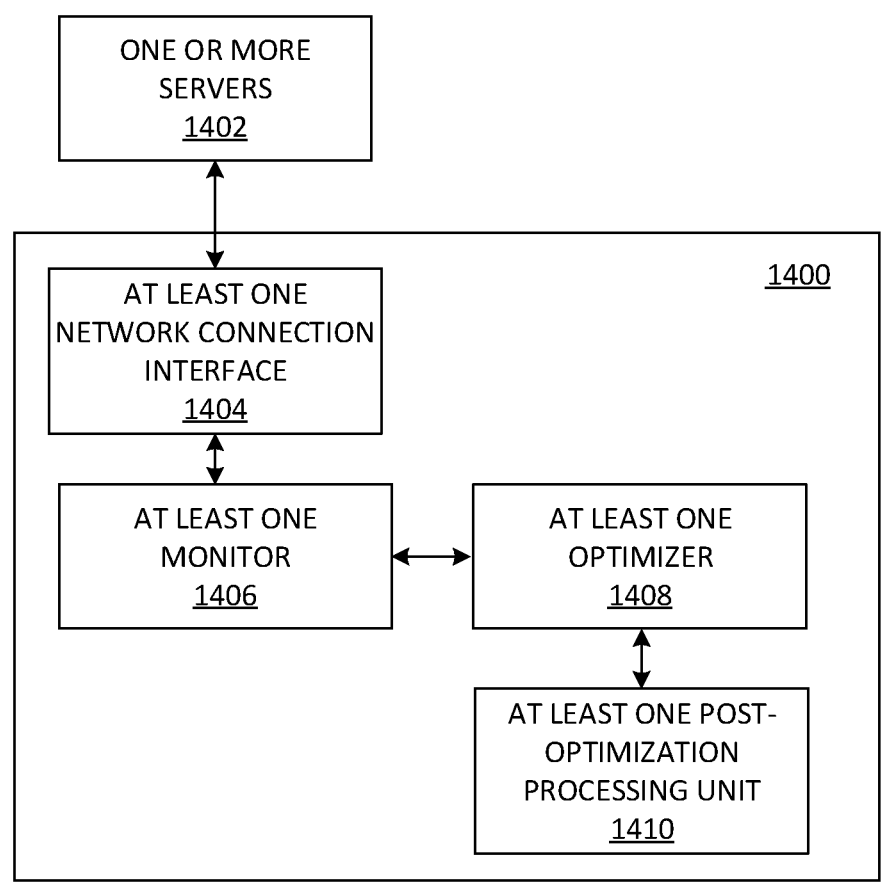
FIG. 14 is a block diagram of a device to facilitate optimizing of a network connection established between the device and one or more servers, in accordance with further embodiments.

FIG. 14 is a block diagram of a device 1400 to facilitate optimizing of a network connection established between the device 1400 and one or more servers 1402 through at least one network, in accordance with some embodiments.

Further, the device 1400 may include at least one network connection interface 1404 configured for establishing the network connection with the one or more servers 1402.

Further, the device 1400 may include at least one monitor 1406 configured for collecting at least one network information associated with the network connection from the at least one network connection interface 1404.

Further, the device 1400 may include at least one optimizer 1408 communicatively coupled with the at least one monitor 1406

Further, the at least one optimizer 1408 may be configured for profiling each frequency channel of a plurality of frequency channels associated with the at least one network connection interface 1404 based on the collecting. Further, the at least one network connection interface 1404 may establish the network connection using at least one frequency channel of the plurality of frequency channels and at least one communication layer parameter of at least one communication layer associated with the at least one network connection interface 1404.

In some embodiments, the profiling may include estimating at least one of a bandwidth and a latency for the each frequency channel of the plurality of frequency channels.

Further, the at least one optimizer 1408 may be configured for determining at least one optimal frequency channel of the plurality of frequency channels based on the profiling.

Further, the at least one optimizer 1408 may be configured for determining at least one optimal communication layer parameter of the at least one communication layer based on the profiling. Further, the at least one network connection interface 1404 may be configured for establishing the network connection using the at least one optimal frequency channel and the at least one optimal communication layer parameter.

Further, the device 1400 may include at least one post-optimization processing unit 1410 communicatively coupled with the at least one optimizer 1408.

Further, the at least one post-optimization processing unit 1410 may be configured for receiving at least one first network performance metric associated with the network connection established using the at least one frequency channel and the at least one communication layer parameter from the at least one network connection interface 1404.

Further, the at least one post-optimization processing unit 1410 may be configured for receiving at least one second network performance metric associated with the network connection established using the at least one optimal frequency channel and the at least one optimal communication layer parameter from the at least one network connection interface 1404.

Further, the at least one post-optimization processing unit 1410 may be configured for analyzing the at least one first network performance metric and the at least one second network performance metric.

Further, the at least one post-optimization processing unit 1410 may be configured for determining an optimization of the network connection based on the analyzing. Further, the at least one network connection interface 1404 may be configured for modifying the network connection based on the determining of the optimization.

Figure 15:
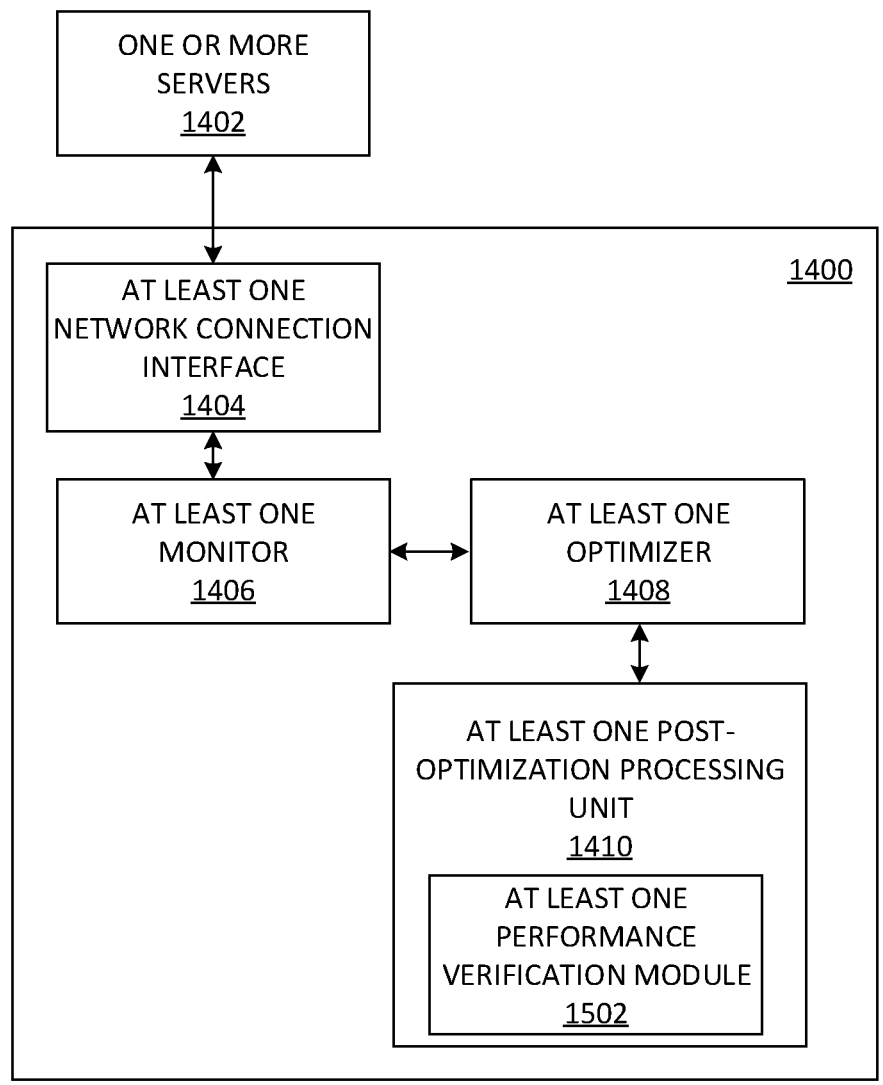
FIG. 15 is a block diagram of the device to facilitate optimizing of a network connection established between the device and one or more servers, in accordance with further embodiments.

FIG. 15 is a block diagram of the device 1400 to facilitate optimizing of a network connection established between the device 1400 and one or more servers 1402 through at least one network, in accordance with further embodiments. Further, the at least one post-optimization processing unit 1410 may include at least one performance verification module 1502.

Further, the at least one performance verification module 1502 may be configured for performing at least one ping for the one or more servers 1402 using the at least one network connection interface 1404.

Further, the at least one performance verification module 1502 may be configured for determining at least one latency corresponding to the at least one ping based on the performing. In some embodiments, the at least one latency may be a round trip latency.

Further, the at least one performance verification module 1502 may be configured for storing the at least one latency.

Figure 16:
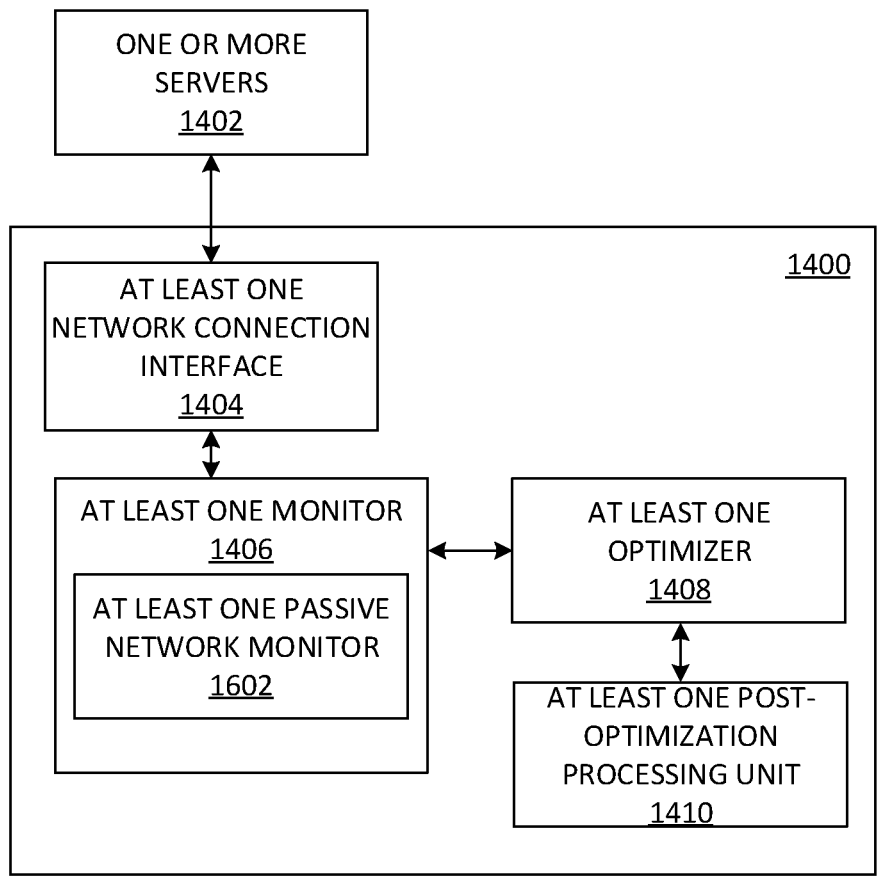
FIG. 16 is a block diagram of the device to facilitate optimizing of a network connection established between the device and one or more servers, in accordance with further embodiments.

FIG. 16 is a block diagram of the device 1400 to facilitate optimizing of a network connection established between the device 1400 and one or more servers 1402 through at least one network, in accordance with further embodiments. Further, the at least one monitor 1406 may include at least one passive network monitor 1602.

Further, the at least one passive network monitor 1602 may be configured for issuing at least one command to at least one virtual device of the device 1400.

Further, the at least one passive network monitor 1602 may be configured for extracting at least one network parameter of the each frequency channel from the at least one virtual device based on the issuing. Further, the at least one network information may include the at least one network parameter.

Figure 17:
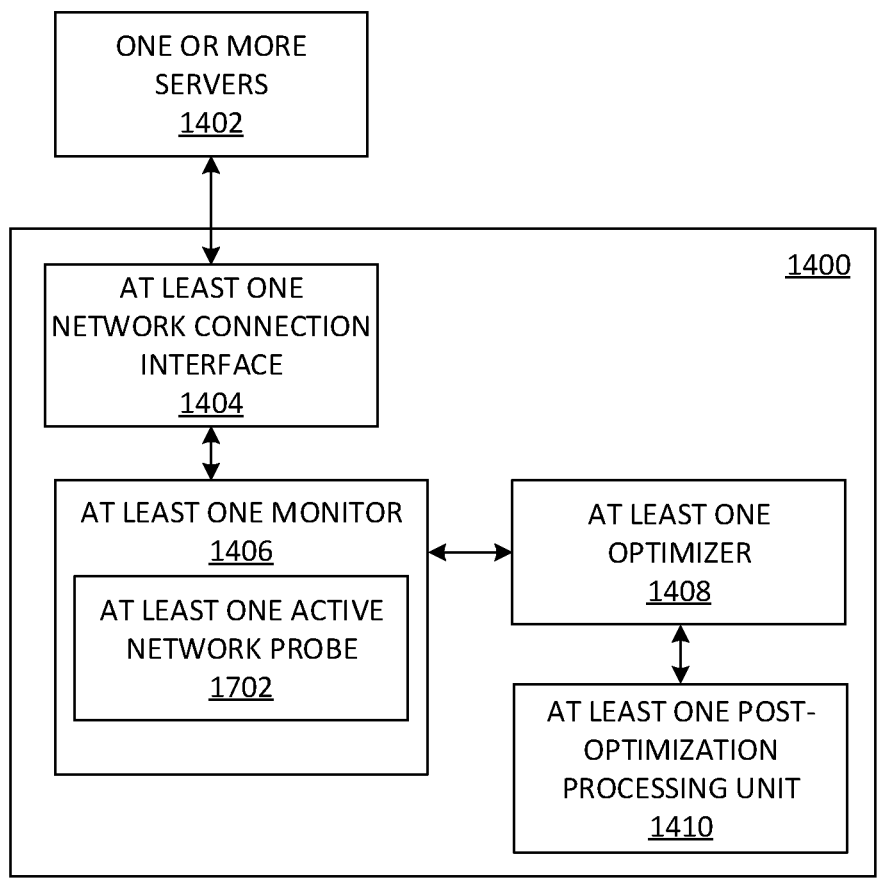
FIG. 17 is a block diagram of the device to facilitate optimizing of a network connection established between the device and one or more servers, in accordance with further embodiments.

FIG. 17 is a block diagram of the device 1400 to facilitate optimizing of a network connection established between the device 1400 and one or more servers 1402 through at least one network, in accordance with further embodiments. Further, the at least one monitor 1406 may include at least one active network probe 1702.

Further, the at least one active network probe 1702 may be configured for transmitting at least one message to the one or more servers 1402 using the at least one network connection interface 1404 via at least one ping. Further, each message of the at least one message may be characterized by a packet size and an inter-packet interval for emulating an application traffic generated by an application executed on the device 1400. Further, the each message may include a timestamp.

Further, the at least one active network probe 1702 may be configured for receiving at least one echo message from the one or more servers 1402 based on the transmitting of the at least one message.

Further, the at least one active network probe 1702 may be configured for analyzing the at least one message and the at least one echo message.

Further, the at least one active network probe 1702 may be configured for generating at least one end-to-end latency measurement based on the analyzing.

Further, the at least one active network probe 1702 may be configured for generating at least one of an average of the at least one end-to-end latency measurement and a standard deviation of the at least one end-to-end latency measurement based on the generating of the at least one end-to-end latency measurement. Further, the at least one network information may include at least one of the at least one end-to-end latency measurement, the at least one of the average of the at least one end-to-end latency measurement, and the standard deviation of the at least one end-to-end latency measurement.

Figure 18:
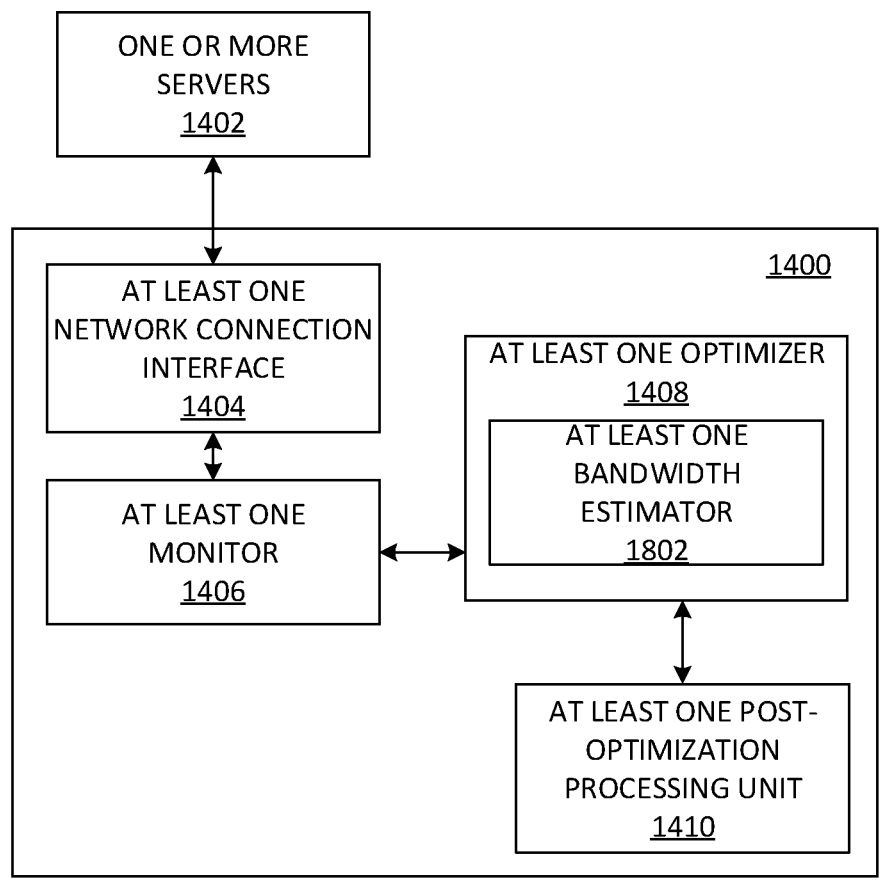
FIG. 18 is a block diagram of the device to facilitate optimizing of a network connection established between the device and one or more servers, in accordance with further embodiments.

FIG. 18 is a block diagram of the device 1400 to facilitate optimizing of a network connection established between the device 1400 and one or more servers 1402 through at least one network, in accordance with further embodiments. Further, the at least one network information may include at least one channel information associated with the each frequency channel. Further, the at least one optimizer 1408 may include at least one bandwidth estimator 1802. Further, the at least one bandwidth estimator 1802 may be configured for analyzing at least one channel information. In some embodiments, the at least one channel information may include a number of available resource blocks associated with the each frequency channel, a number of resource elements in each available resource block, a number of resource elements occupied by the reference signals, a number of antennas in the device 1400.

Further, the at least one bandwidth estimator 1802 may be configured for determining a bandwidth of the each frequency channel based on the analyzing.

Further, the at least one bandwidth estimator 1802 may be configured for generating a bandwidth index for the each frequency channel based on the determining. Further, at least one of the determining of the at least one optimal frequency channel and the determining of the at least one optimal communication layer parameter may be based on the generating.

Figure 19:
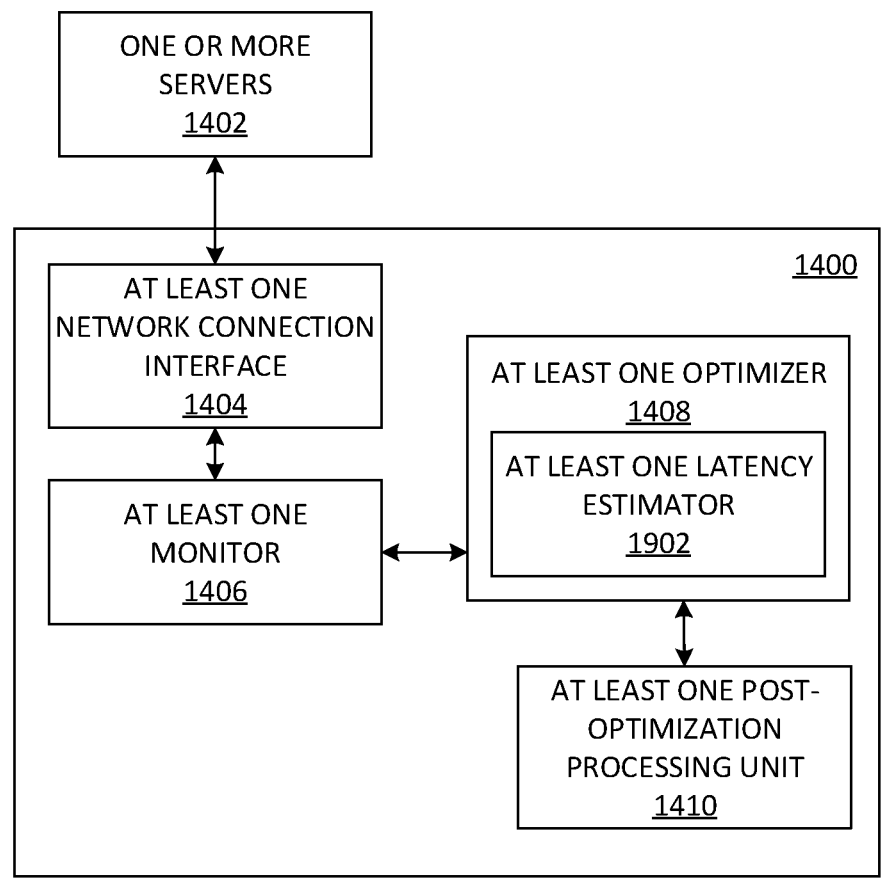
FIG. 19 is a block diagram of the device to facilitate optimizing of a network connection established between the device and one or more servers, in accordance with further embodiments.

FIG. 19 is a block diagram of the device 1400 to facilitate optimizing of a network connection established between the device 1400 and one or more servers 1402 through at least one network, in accordance with further embodiments. Further, the at least one network information may include at least channel measurement associated with the each frequency channel. Further, the at least one optimizer 1408 may include at least one latency estimator 1902. Further, the at least one latency estimator 1902 may be configured for analyzing the at least one channel measurement.

In some embodiments, the at least one channel measurement may include the at least one end-to-end latency measurement, the at least one of the average of the at least one end-to-end latency measurement, and the standard deviation of the at least one end-to-end latency measurement associated with the each frequency channel.

Further, the at least one latency estimator 1902 may be configured for determining a latency associated with the each frequency channel based on the analyzing.

Further, the at least one latency estimator 1902 may be configured for generating a latency score for the each frequency channel based on the determining. Further, at least one of the determining of the at least one optimal frequency channel may be based on the generating and the determining of the at least one optimal communication layer parameter may be based on the generating.

Figure 20:
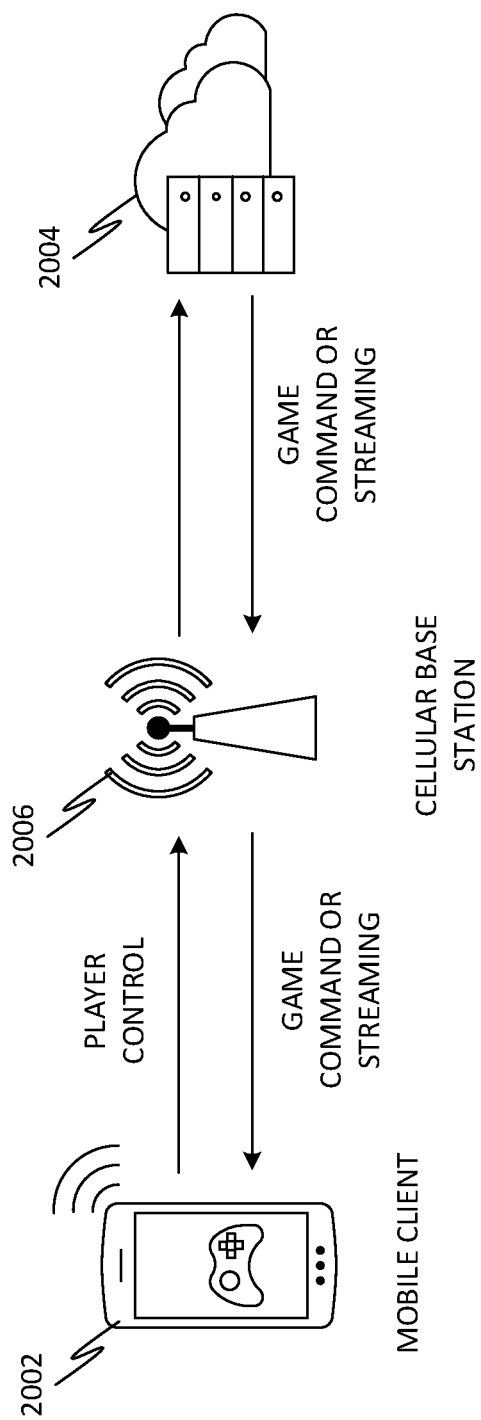
FIG. 20 is a schematic showing communication between a mobile phone and one or more gaming servers, in accordance with some embodiments.

FIG. 20 is a schematic showing communication between a mobile phone 2002 and one or more gaming servers 2004, in accordance with some embodiments. The mobile phone 2002 may communicate with the one or more gaming servers 2004 via one or more stations (such as a cellular base station 2006). The mobile phone 2002 (client) may communicate with the one or more gaming servers 2004 via wireless-technologies (e.g., 4G LTE, 5G and so on).

Further, an online mobile game application may be installed on the mobile phone 2002. Further, the online mobile game application may involve the client-side game application and one or more gaming servers 2004. At runtime, a game player may control the game on the mobile phone 2002. The mobile phone 2002 may wirelessly stream the player control command to the one or more gaming servers 2004 via cellular networks. Based on the game player's control, the one or more gaming servers 2004 may render the graphical frames (in the cloud gaming) or synchronize the control from multiple players (in the multi-player online games). Further, the one or more gaming servers 2004 may stream the graphical frames and/or game commands to the mobile phone 2002 (via cellular networks).

Figure 21:
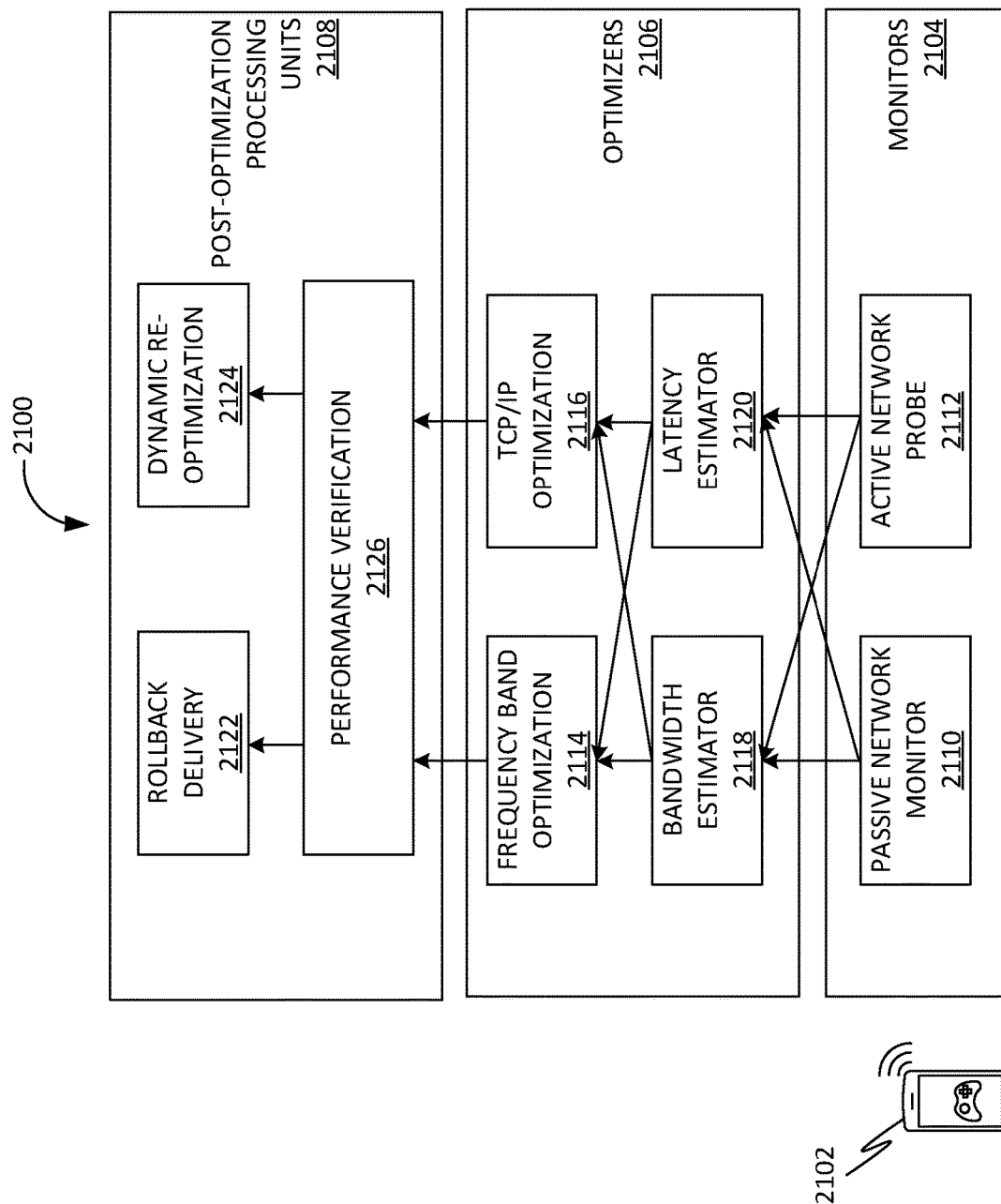
FIG. 21 is a block diagram of a system for facilitating optimizing of a network connection established between the device and one or more servers through at least one network, in accordance with some embodiments.

FIG. 21 is a block diagram of a system 2100 for facilitating optimizing of a network connection established between the device and one or more servers through at least one network, in accordance with some embodiments. Further, the system 2100 may be implemented inside the mobile clients (such as a mobile client 2102) as a background system application, and composes of three components: the monitors 2104, the optimizers 2106, and the post-optimization processing units 2108. The mobile clients may include one or more of smartphones, mobile game consoles, pads, etc.

Further, the monitors 2104 may include one or both of a passive network monitor 2110 and an active network probe 2112.

Further, the optimizers 2106 may include one or more of a frequency band optimization module 2114, a TCP/IP optimization 2116, a bandwidth estimator 2118 and a latency estimator 2120.

Further, the post-optimization processing units 2108 may include one or more of a rollback delivery module 2122, a dynamic re-optimization module 2124 and performance verification module 2126.

Figure 22:
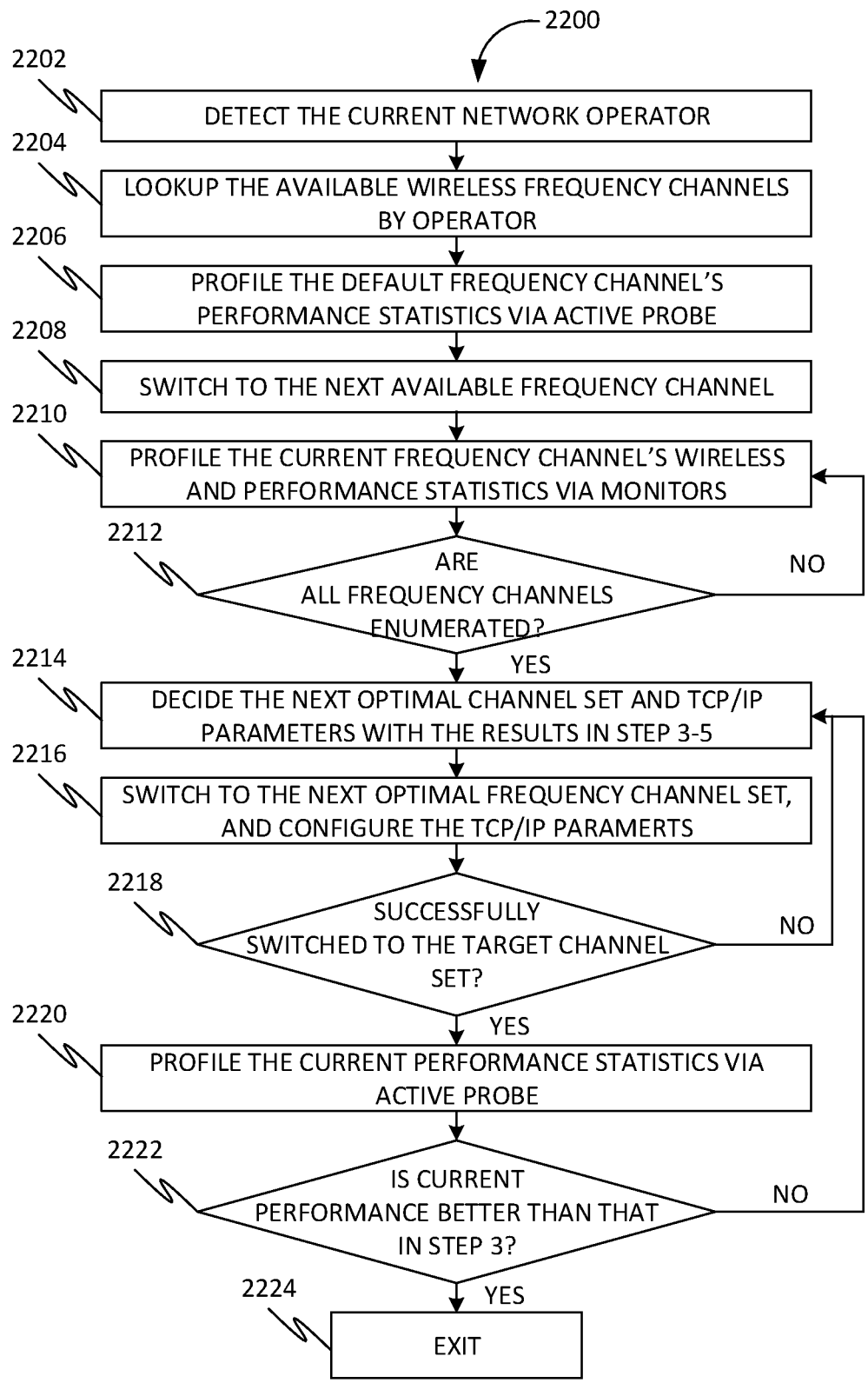
FIG. 22 is a flowchart of a method for overall in-client optimization procedure, in accordance with some embodiments.

FIG. 22 is a flowchart of a method 2200 for overall in-client optimization procedure, in accordance with some embodiments. Accordingly, at 2202, the method 2200 may include a step of detecting, a cellular network operator based on a usage by a client. Further, the cellular network operator may be detected using a mobile country code (MCC), and a mobile network code (MNC) based on an application programming interface (API) of a mobile operating system.

Further, at 2204, the method 2200 may include a step of looking up, available wireless frequency channels based on the detection of type of the cellular network operator. Further, the available wireless frequency channels may include, in an instance, E-Utra Absolute Radio Frequency Channel Number (EARFCN) in 4G LTE, and New Radio Absolute Radio Frequency Channel Number (NR-ARFCN) in 5G. Further, the available wireless frequency channels may be based on spectrum allocation policies by Federal Communications Commission (FCC).

Further, at 2206, the method 2200 may include a step of profiling, network performance of a default frequency channel before the optimization.

Further, at 2208, the method 2200 may include a step of switching, the default frequency channel to a next available frequency channel.

Further, at 2210, the method 2200 may include a step of profiling the current frequency channel's wireless and performance statistics via monitors. Further, the method 2200 may include a step of optimizing, one or more wireless frequency channels, and physical and TCP/IP layer configurations associated with each wireless frequency channel of the one or more wireless frequency channels. Further, the optimizing may be based on the profiling of the each wireless frequency channel with TCP/IP performance and runtime performance associated with the each wireless frequency channel. Further, a passive network monitor and an active network probe may realize the profiling.

Further, at 2212, the method 2200 may include a step of determining, if the one or more wireless frequency channels are enumerated. Further, if it is determined that the one or more wireless frequency channels have not been enumerated, then the method 2200 may go to 2210. However, if it is determined that the one or more available wireless frequency channels have been enumerated, then the method 2200 may go to 2214. Further, based on a result of the profiling of the each wireless frequency channel, an optimizer may estimate bandwidth and/or latency of the each wireless frequency channel.

Further, at 2214, the method 2200 may include a step of deciding, optimal wireless frequency channels and corresponding TCP/IP parameters the client may use.

Further, at 2216, the method 2200 may include a step of switching, an optimal frequency channel set to a next optimal frequency channel set. Further, the TCP/IP parameters corresponding to the next optimal frequency channel set may be configured.

Further, at 2218, the method 2200 may include a step of determining if the switching to a target channel set is successful. Further, if it is determined that the switching to the target channel set has not been successful, then the method 2200 may go to 2214. Further, the determining in such a case may imply a roll-back and may select a secondary optimal channel set and corresponding TCP/IP configurations. However, if it is determined that the switching to the target channel set has been successful, then the method 2200 may go to 2220.

Further, at 2220, the method 2200 may include a step of profiling, current performance statistics of current optimal frequency channel set. Further, the profiling may be realized by the active network probe.

Further, at 2222, the method 2200 may include a step of determining if performance of the current optimal frequency channel set is better than the optimization profiled at 2206. Further, if it is determined that the performance of the current optimal frequency channel set has not been better than the optimization profiled at 2206, then the method 2200 may go to 2214. However, if it is determined that the performance of the current optimal frequency channel set is better than the optimization profiled at 2206, then the method 2200 may go to 2224 to finish the optimization.

FIG. 23 is a notation table 2300 including the description of the notations used in the present disclosure. For example, the notations may include RSRP, RSRQ, RSSI, and so on.

Figure 24:
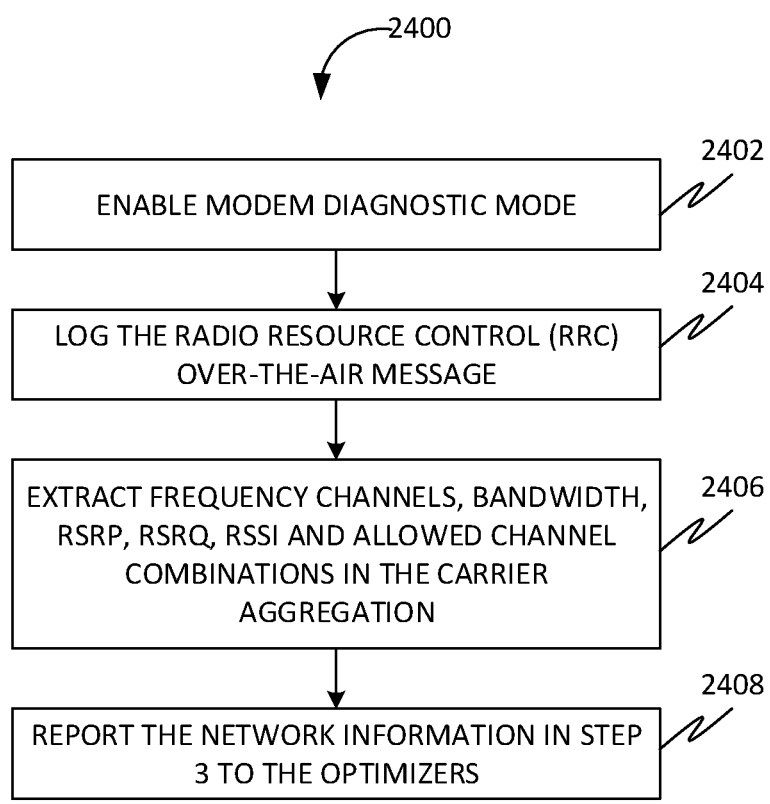
FIG. 24 is a flowchart of a method related to a passive network monitor, in accordance with some embodiments.

FIG. 24 is a flowchart of a method 2400 related to the passive network monitor 2110, in accordance with some embodiments. Further, the passive network monitor 2110 may collect wireless parameters and performance statistics. Further, the wireless parameters and the performance statistics may be based on available wireless channel bands such as, but are not limited to, E-Utra Absolute Radio Frequency Channel Number (EARFCN) in 4G LTE, and New Radio Absolute Radio Frequency Channel Number (NR-ARFCN) in 5G. Further, the wireless parameters and the performance statistics may include, but are not limited to, Reference Signal Received Power (RSRP), Reference Signal Received Quality (RSRQ), Received Signal Strength Indicator (RSSI), Time Division Duplexing (TDD) downlink resource configuration, and allowed channel combination options for carrier aggressions. Further, the wireless parameters and the performance statistics may be inaccessible on a mobile client (e.g., smartphones, mobile game consoles, pads, etc.) based on an Application Programming Interface (API) associated with an Operating System (OS) (e.g., Android, iOS, etc.).

Further, at 2402, the method 2400 may include a step of enabling, diagnostic mode for commodity cellular hardware modems. Further, a mapping may be performed from the cellular modem to a virtual device (e.g. /dev/diag/) based on the OS. Further, one or more cellular messages may be exposed as binary streams based on the mapping. Further, the mapping may be activated by issuing one or more commands directly to the virtual device (e.g., via IOCtl ( ) or AT command AT+TRACE). Further, the one or more commands may depend on a chipset and the OS of the mobile client. Further, the one or more commands may include activation or deactivation of type of the one or more cellular messages, and call-back registrations for receiving hex logs. Further, one or more hex log streams may be pulled from the virtual device. Further, the one or more hex log streams may be passed to an in-device message parser.

Further, at 2404, the method 2400 may include a step of enabling a logging function associated with a runtime 4G radio resource control (RRC) signaling messages and/or 5G RRC signaling messages.

Further, at 2406, the method 2400 may include a step of extracting, the wireless parameters and the performance statistics.

Further, at 2408, the method 2400 may include a step of reporting, the wireless parameters and the performance statistics to bandwidth/latency estimator and optimizers.

Figure 25:
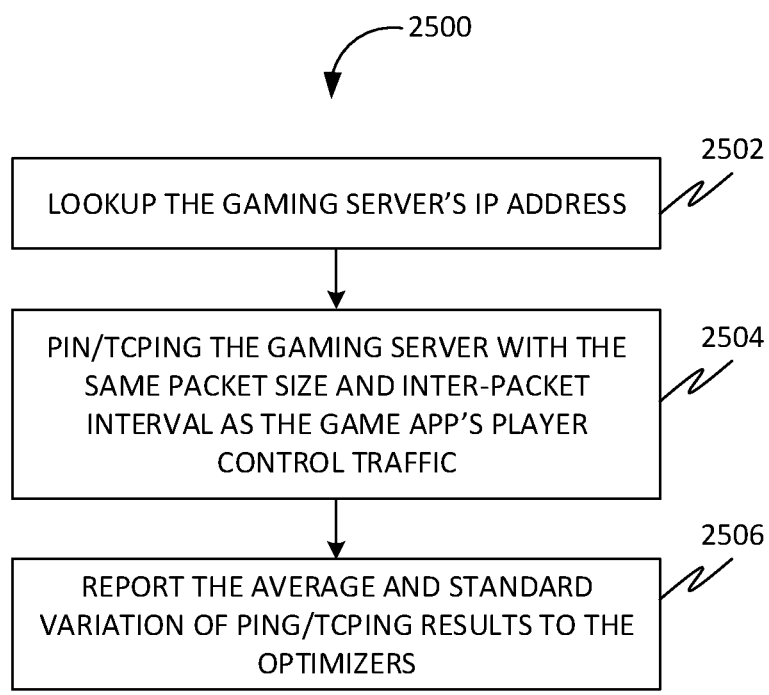
FIG. 25 is a flowchart of a method related to an active network probe, in accordance with some embodiments.

FIG. 25 is a flowchart of a method 2500 related to the active network probe 2112, in accordance with some embodiments. Further, the active network probe 2112 may directly measure an end-to-end network performance between a mobile client and a gaming server.

Further, at 2502, the method 2500 may include a step of looking up, an internet protocol (IP) address associated with the gaming server based on resolving using a client-side domain name system (DNS) query.

Further, at 2504, the method 2500 may include a step of emulating, player control traffic of a real game application with a same packet size and an inter-packet interval, and may send one or more probe messages to the gaming server using ping or TCPing based on the resolving. Further, the TCPing may ping the gaming server on a specific port using transmission control protocol/internet protocol (TCP/IP) by opening and/or closing a connection on the specified port.

Further, the one or more probe messages may carry one or more timestamps. Further, each timestamp of the one or more timestamps may be associated with each probe message of the one or more probe messages. Further, the one or more probe messages may trigger one or more echo messages from the gaming server.

Further, at 2506, the method 2500 may include a step of reporting, average and standard deviation of measurements based on the triggering to bandwidth/latency estimators and optimizers.

Figure 26:
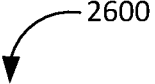
FIG. 26 is a table that illustrates how to map the downlink wireless spectrum bandwidth to the number of 4G LTE radio source elements, in accordance with some embodiments.

FIG. 26 is a table 2600 that illustrates how to map the downlink wireless spectrum bandwidth to the number of 4G LTE radio source elements, in accordance with some embodiments.

Figure 27:
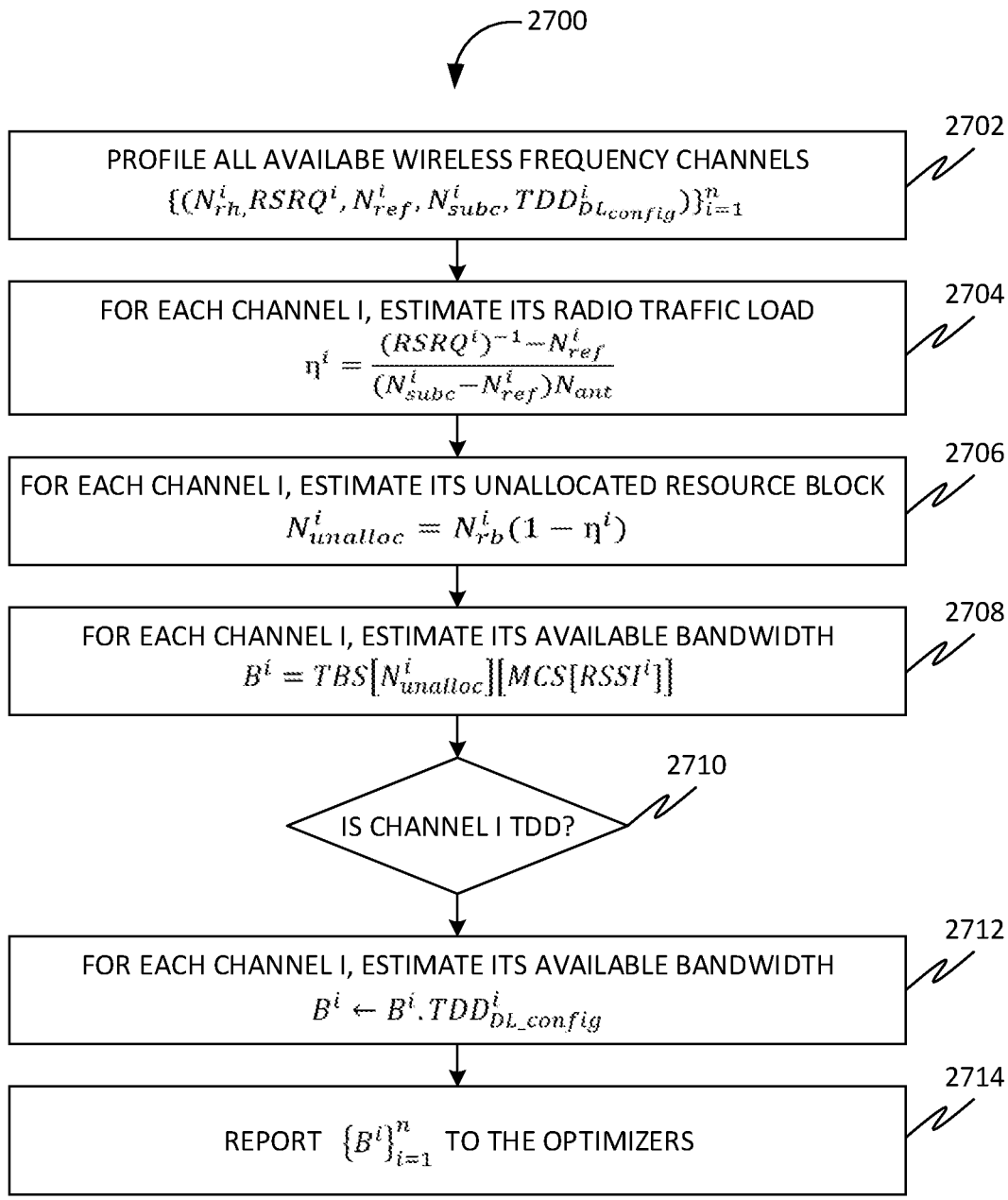
FIG. 27 is a flowchart of a method related to a bandwidth estimator, in accordance with some embodiments.

FIG. 27 is a flowchart of a method 2700 related to the bandwidth estimator 2118, in accordance with some embodiments. Further, the bandwidth estimator 2118 may estimate a last-mile bandwidth of a wireless link (may typically be a bandwidth bottleneck). Further, the last-mile bandwidth of the wireless link may be based on runtime measurements.

Further, at 2702, the method 2700 may include a step of looking-up/profiling, available physical resource blocks such as, a number of downlink orthogonal frequency-division multiplexing (OFDM) resource blocks ($N_{rb}$), a number of resource elements in each OFDM resource blocks ($N_{subc}$), and a number of resource elements occupied by reference signals ($N_{ref}$) for each available wireless channel i of one or more wireless channels. Further, the looking up, standardized by public 4G and 5G standards, may be based on channel width of the each available wireless channel i based on the table 2600.

Further, at 2704, the method 2700 may include a step of estimating, a percentage of un-allocated resource block $\eta^i$ (or a radio traffic load) of the each wireless channel i based on an equation number 1 below, $$\eta^i = \frac{(RSRQ^i)^{-1} - N_{ref}^i}{(N_{subc}^i - N_{ref}^i) \cdot N_{ant}} \quad (1)$$

Further, a lower $\eta^i$ may indicate a less-utilized wireless channel from the each available wireless channel i of the one or more wireless channels.

Further, at 2706, the method 2700 may include a step of estimating, a number of unallocated radio resource blocks $N_{unalloc}^i = N_{rb}^i \cdot (1-\eta^i)$ for the each available wireless channel i using the bandwidth estimator 2118.

Further, at 2708, the method 2700 may include a step of estimating, an available bandwidth for the each available wireless channel i based on the equation number 2 below, $$B^i = TBS[N_{unalloc}^i][MCS[RSSI^i]] \quad (2)$$

Further, the term transport block size (TBS) may represent in the corresponding tables (such as tables 7.1.7.1-1 and 7.1.7.2.1) in 3GPP TS36.213 corresponding to the 4G LTE standard, or TS38.212 corresponding to the 5G standard. Further, the term modulation and coding scheme (MCS) may represent a table that may map the RSSI to a discrete modulation and coding scheme. Further, the mapping may depend on an implementation of the table corresponding to the term MCS.

Further, at 2710, the method 2700 may include a step of determining, if the each available wireless channel i is based on time-division duplexing (TDD). Further, if it is determined that the each available wireless channel i is not based on the time-division duplexing (TDD), then the method 2700 may go to 2714. Further, however, if it is determined that the each available wireless channel i is based on the time-division duplexing (TDD), then the method 2700 may go to 2712.

Further, at 2712, the method 2700 may include a step of calibrating/estimating, an available bandwidth estimation of the each available wireless channel i based on a configured percentage of downlink resource blocks $B^i \leftarrow B^i \cdot TDD_{DL\_config}^i$ using the bandwidth estimator 2118.

Further, at 2714, the method 2700 may include a step of reporting, results of the available bandwidth estimation of the each available wireless channel i $\{B\}_{i=1}^n$ based on the calibrating. Further, the results may be reported using the bandwidth estimator 2118 to optimizers.

Figure 28:
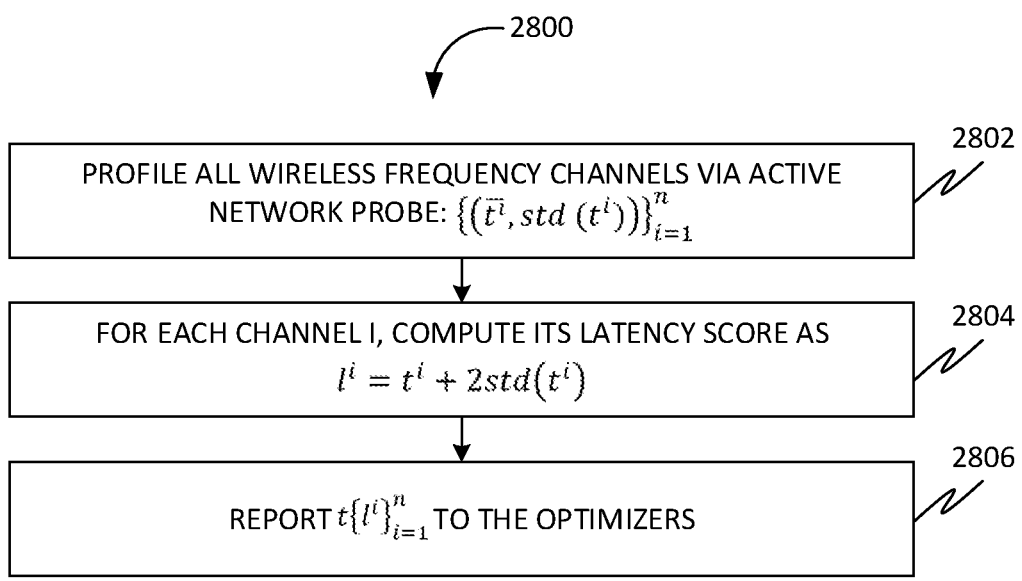
FIG. 28 is a flowchart of a method related to a latency estimator, in accordance with some embodiments.

FIG. 28 is a flowchart of a method 2800 related to the latency estimator 2120, in accordance with some embodiments. Further, the latency estimator 2120 may assign a latency score for each wireless channel i of one or more wireless channels based on runtime end-to-end ping/TCP ping measurements. Further, the TCP ping measurements may be based on pinging of a gaming server on a specific port using transmission control protocol/internet protocol (TCP/IP) by opening and/or closing a connection on the specified port.

Further, at 2802, the method 2800 may include a step of profiling, the runtime end-to-end ping/TCP ping measurements for the each wireless channel i $\{(\bar{t}^i, std(t^i))\}_{i=1}^n$ from the active network probe 2112.

Further, at 2804, the method 2800 may include a step of computing, the latency score for the each wireless channel i using the active network probe based on the equation number 3 below, $$l^i = \bar{t}^i + 2std(t^i) \quad (3)$$

Further, the term $\bar{t}^i$ and the term $std(t^i)$ are average and standard deviation of the runtime end-to-end ping/TCP ping latency measurements respectively, from the active network probe.

Further, at 2806, the method 2800 may include a step of reporting, results $\{l^i\}_{i=1}$ based on the computing using the latency estimator 2120 to optimizers.

Figure 29:
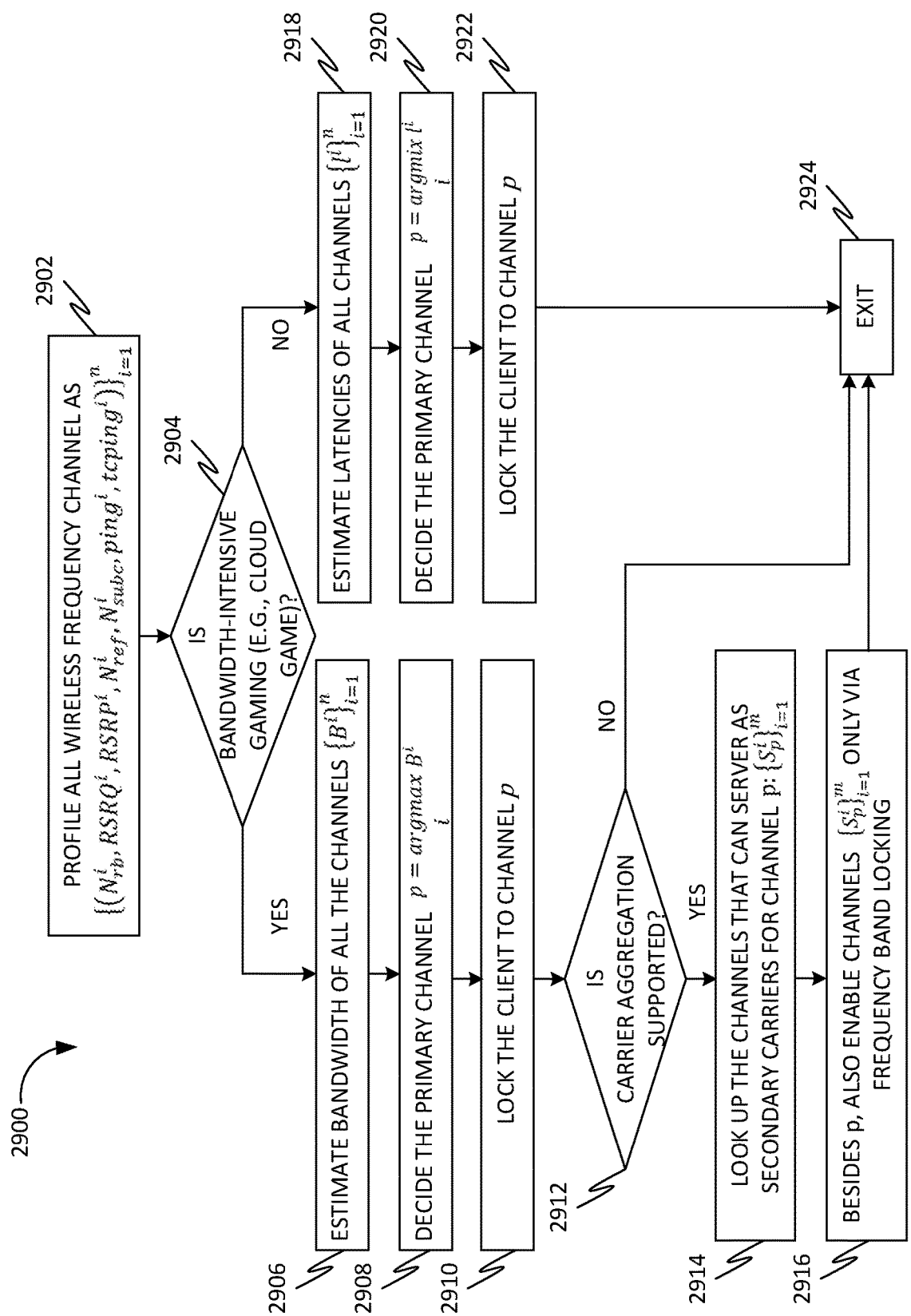
FIG. 29 is a flowchart of a method related to a frequency band optimization, in accordance with some embodiments.

FIG. 29 is a flowchart of a method 2900 related the frequency band optimization module 2114, in accordance with some embodiments. Further, an optimizer may be configured to perform the frequency band optimization. Further, the optimizer may choose configuration strategies based on a type of a game. Further, the optimizer, in an instance, may seek to maximize a wireless channel bandwidth for bandwidth-intensive games, such as cloud gaming, video-streamed gaming, etc. Further, the wireless channel bandwidth may be associated with a frequency band of a plurality of frequency bands.

Further, at 2902, the method 2900 may include a step of profiling, each wireless frequency channel $\{(N_{rb}^i, RSRQ^i, RSRP^i, N_{ref}^i, N_{subc}^i, ping^i, tcping^i)\}_{i=1}^n$ of one or more wireless frequency channels using monitors. Further, the monitors may include the passive network monitor 2110 and the active network probe 2112.

Further, at 2904, the method 2900 may include a step of determining, if the type of the game is a bandwidth-intensive game. Further, if it is determined that the type of the game is not the bandwidth-intensive game, then the method 2900 may go to 2918. However, if it is determined that the type of the game is the bandwidth-intensive game, then the method 2900 may go to 2906.

Further, at 2906, the method 2900 may include a step of estimating, bandwidth of the each wireless frequency channel $\{B^i\}_{i=1}^n$ of the one or more wireless frequency channels using a bandwidth estimator.

Further, at 2908, the method 2900 may include a step of deciding, a first primary wireless frequency channel $$p = \underset{i}{\arg\max} \; B^i$$

of the each wireless frequency channel. Further, the first primary wireless frequency channel may have a maximum wireless frequency channel bandwidth.

Further, at 2910, the method 2900 may include a step of locking, the first primary wireless frequency channel p on a mobile client.

Further, at 2912, the method 2900 may include a step of determining if the mobile client has a support for carrier aggregation. Further, the carrier aggregation may include a process of combining multiple wireless frequency channels. Further, the carrier aggregation may result in more bandwidth. Further, if it is determined that the mobile client does not have the support for the carrier aggregation, the method 2900 may go to 2924 to exit. However, if it is determined that the mobile client has the support for the carrier aggregation, then the method 2900 may go to 2914.

Further, at 2914, the method 2900 may include a step of looking up, available wireless frequency channels of the one or more wireless frequency channels. Further, one or more available wireless frequency channels may serve as secondary carriers for the first primary wireless frequency channel p: $\{S_p^i\}_{i=1}^m$. Further, the one or more available wireless frequency channels may combine with the first primary wireless frequency channel.

Further, at 2916, the method 2900 may include a step of enabling, at least one of the one or more available wireless frequency channels $\{S_p^i\}_{j=1}^m$ on the mobile client with the first primary wireless frequency channel. Further, the enabling may be based on a frequency band locking mechanism.

Further, at 2918, the method 2900 may include a step of estimating, one or more latencies $\{l^i\}_{i=1}^n$ associated with the one or more wireless frequency channels. Further, the estimating may be based for the type of the game precluding heavy network traffic transfer, such as multiplayer online role-playing games, etc.). Further, the optimizer, in an instance, may minimize end-to-end network latency. Further, the profiling of the each wireless frequency channel of the one or more wireless frequency channels may be performed using the monitors. Further, the monitors, in an instance, may assign the each wireless frequency channel with a latency score from a latency estimator.

Further, at 2920, the method 2900 may include a method of deciding, a second primary wireless frequency channel from the one or more wireless frequency channels. Further, the second primary wireless frequency channel may be based on a minimal latency score $$p = \underset{i}{\arg\min} \; l^i.$$

Further, at 2922, the method 2900 may include a step of locking, the mobile client to the second primary wireless frequency channel. Further, the carrier aggregation may impact marginally on the latency of small data, and in an instance, may be avoided. Further, at 2924, the method 2900 may include a step of exiting.

Figure 30:
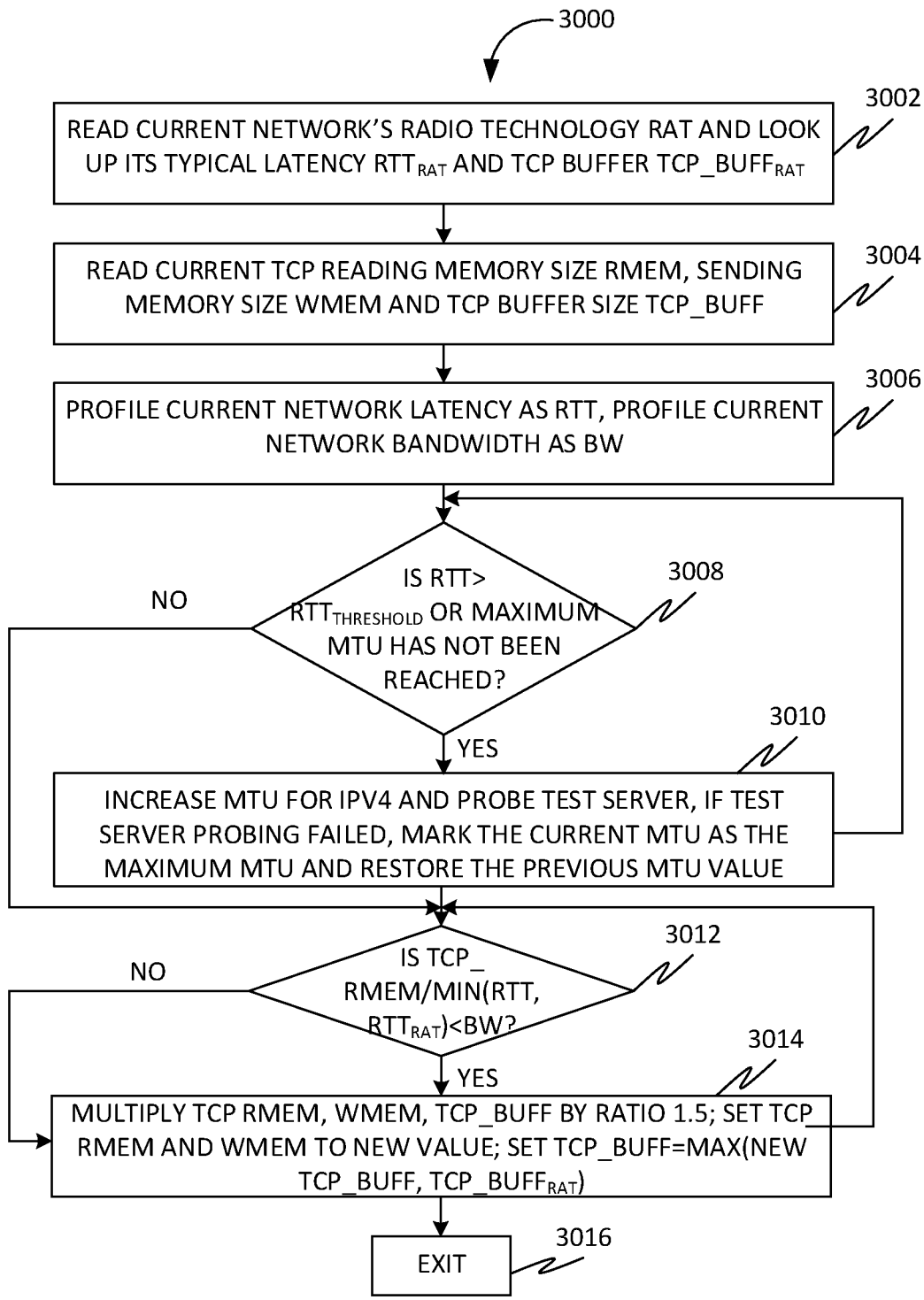
FIG. 30 is a flowchart of a method for a transmission control protocol/internet protocol (TCP/IP) optimization, in accordance with some embodiments.

FIG. 30 is a flowchart of a method 3000 for the transmission control protocol/internet protocol (TCP/IP) optimization 2116, in accordance with some embodiments. Further, one or more parameters at a TCP/IP layer may be preset in an operating system associated with a mobile client. Further, the one or more parameters may not be optimized. Further, a TCP/IP optimizer submodule may perform at least three optimizations based on inputs from a latency estimator and a bandwidth estimator. Further, the at least three optimizations may include, but are not limited to, TCP receive memory size optimization, TCP send memory size optimization, TCP buffer size optimization, and internet protocol maximum transmission unit (IP MTU) optimization.

Further, at 3002, the method 3000 may include a step of reading, a network radio technology type (e.g. 4G LTE, 5G and beyond) and may include looking up a typical latency ($RTT_{RAT}$) and a TCP buffer size ($TCP\_BUFF_{RAT}$) associated with the network radio technology type using the TCP/IP optimizer submodule.

Further, 3004, the method 3000 may include a step of reading, current TCP receive memory size (RMEM), current TCP sending memory size (WMEM), and current TCP buffer size (TCP_BUFF) using the TCP/IP optimizer submodule.

Further, at 3006, the method 3000 may include a step of receiving, a profiled RTT and a profiled network bandwidth (BW).

Further, at 3008, the method 3000 may include a step of determining if equation $RTT>RTT_{THRESHOLD}$ is satisfied or maximum MTU is reached. Further, if it is determined that at least one of the equation $RTT>RTT_{THRESHOLD}$ is not satisfied and the maximum MTU has not been reached is true, then the method 3000 may go to 3010. Further, the TCP/IP optimizer submodule may increase MTU for IPv4, and may probe a test server. However, if it is determined that both the equation $RTT>RTT_{THRESHOLD}$ is satisfied or the maximum MTU has been reached are false, then the TCP/IP optimizer submodule may mark a current MTU as the maximum MTU, and may restore previous MTU value and the method 3000 may go to 3012.

Further, at 3012, the method 3000 may include a step of determining if the equation TCP_RMEM/min (RTT, $RTT_{RAT}$)<BW is satisfied. Further, if it is determined that the equation TCP_RMEM/min (RTT, $RTT_{RAT}$)<BW is not satisfied, then the TCP/IP optimizer submodule may set the TCP RMEM and the TCP WMEM respectively to a new value. Further, the TCP/IP optimizer submodule may set the TCP_BUFF=max (new TCP_BUFF, $TCP\_BUFF_{RAT}$).

However, if it is determined that the equation TCP_RMEM/min (RTT, $RTT_{RAT}$)<BW is satisfied, then the TCP/IP optimizer submodule may multiply the TCP RMEM, the TCP WMEM, the TCP_BUFF by a preset adjustable ratio of 1.5 at 3014. Further, at 3016, the method 3000 may include a step of exiting.

Figure 31:
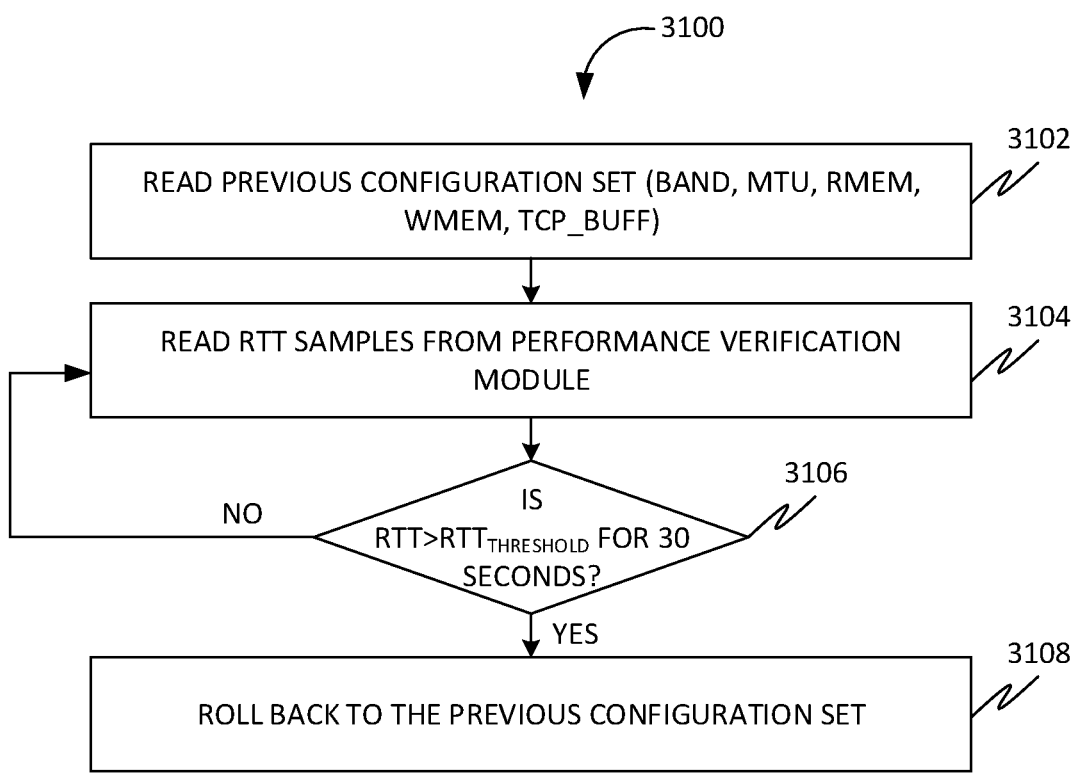
FIG. 31 is a flowchart of a method for a rollback delivery/recovery, in accordance with some embodiments.

FIG. 31 is a flowchart of a method 3100 for the rollback delivery/recovery 2122 (such as, in presence of frequency band switching failures, a lose radio coverage, or switching to suboptimal frequency bands, etc.), in accordance with some embodiments.

Further, at 3102, the method 3100 may include a step of reading, a previous configuration set. Further, a rollback module may store the pervious configuration set. Further, the previous configuration set may include BAND, TCP receive memory size (RMEM), TCP sending memory size (WMEM), maximum transmission unit (MTU), and TCP buffer size (TCP_BUFF).

Further, at 3104, the method 3100 may include a step of reading, network round-trip latency (RTT) samples from a performance verification module. Further, the RTT samples may include typical latency ($RTT_{RAT}$) and network round-trip latency threshold ($RTT_{THRESHOLD}$).

Further, at 3106, the method 3100 may include a step of determining if equation $RTT>RTT_{THRESHOLD}$ is satisfied for at least 30 seconds. Further, the determining may be based on a constant probing of a test server. Further, if it is determined that the equation $RTT>RTT_{THRESHOLD}$ is not satisfied for at least 30 seconds, then the method 1300 may go to 1304. Further, if it is determined that the equation $RTT>RTT_{THRESHOLD}$ is satisfied for at least 30 seconds, then the method 3100 may go to 3108.

Further, at 3108, the method 3100 may include a step of roll-backing to the previous configuration set.

Figure 32:
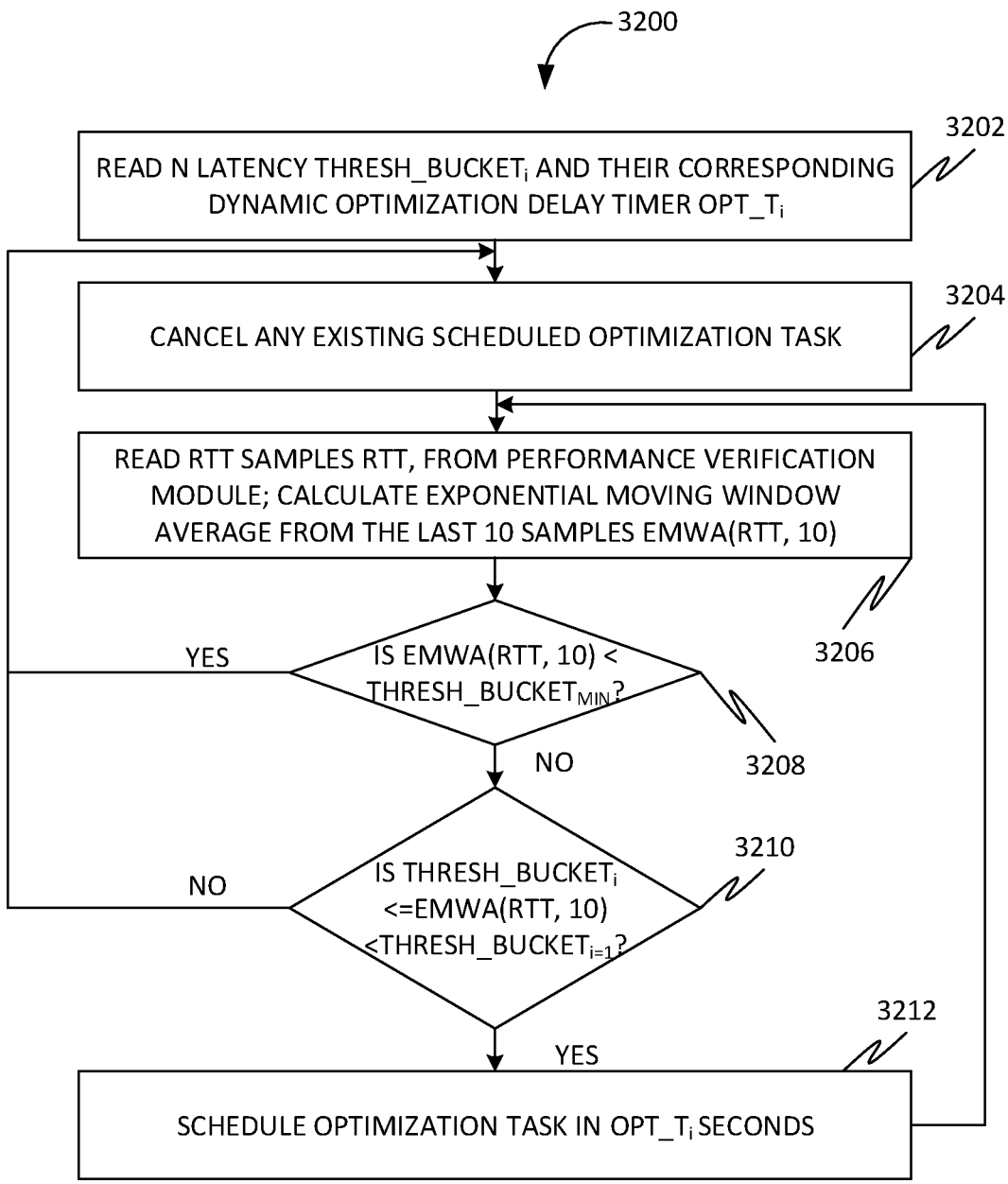
FIG. 32 is a flowchart of a method for a dynamic re-optimization, in accordance with some embodiments.

FIG. 32 is a flowchart of a method 3200 for the dynamic re-optimization 2124, in accordance with some embodiments. Further, a dynamic re-optimization submodule 2124 may be constantly running as a background process.

Further, at 3202, the method 3200 may include a step of reading, "N" latency predefined threshold buckets ($THRESH\_BUCKET_i$) and corresponding dynamic optimization delay timer $OPT\_T_i$ in a program initialization phase. Further, the letter "N" may correspond to a number.

Further, at 3204, the method 3200 may include a step of cancelling, a scheduled re-optimization task, if any.

Further, at 3206, the method 3200 may include a step of reading, recorded one or more samples of network round-trip latency RTT (each sample of the more or more samples may be referred as $RTT_i$) from a performance verification module. Further, an exponential moving window average (EMWA) may be calculated from the last 10 samples EMWA (RTT, 10).

Further, at 3208, the method 3200 may include a step of determining if the equation EMWA (RTT, 10)<$THRESH\_BUCKET_{MIN}$ is satisfied. Further, the determining may be based on a core logic for comparing the exponential moving window average with the predefined threshold buckets. Further, if it is determined that the equation EMWA (RTT, 10)<$THRESH\_BUCKET_{MIN}$ is not satisfied, then the method 3200 may go to 3210. Further, if it is determined that the equation EMWA (RTT, 10)<$THRESH\_BUCKET_{MIN}$ is satisfied, then the method 3200 may go to 3204.

Further, at 3210, the method 3200 may include a step of determining if the equation THRESH_BUCKETi<=EMWA (RTT, 10)<$THRESH\_BUCKET_{i+1}$ is satisfied. Further, if it is determined that the equation THRESH_BUCKETi<= EMWA (RTT, 10)<$THRESH\_BUCKET_{i\pm1}$ is not satisfied, then the method 3200 may go to 3204. Further, if it is determined that the equation THRESH_BUCKETi<= EMWA (RTT, 10)<$THRESH\_BUCKET_{i\pm1}$ is satisfied, then the method 3200 may go to 3212.

Further, at 3212, the method 3200 may include a step of scheduling, an optimization task based on the $OPT\_T_i$ in seconds.

Figure 33:
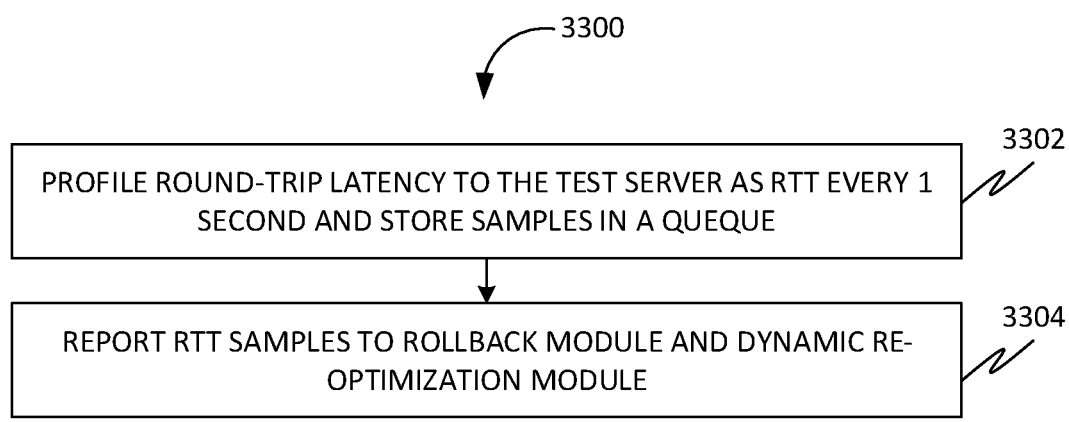
FIG. 33 is a flowchart of a method for the performance verification, in accordance with some embodiments.

FIG. 33 is a flowchart of a method 3300 for the performance verification 2126, in accordance with some embodiments.

Further, at 3302, the method 3300 may include a step of profiling, a network round-trip latency (RTT) to a test server. Further, a submodule may continuously perform ping/TCP ping on a designated test server in a background for a tunable interval, i.e., 1 second. Further, the submodule may store results based on the profiling as the RTT to the designated test server.

Further, at 3304, the method 3300 may include a step of reporting, the results to a rollback submodule and a dynamic re-optimization submodule.

Aspects

Aspect 1—A client-side system for optimizing the network latency for the online mobile games, which composes of the monitors, the optimizers, and the post-optimization processing units.

Aspect 2—The system recited in aspect 1, wherein said the monitor composes of the passive network monitor and the active network probe.

Aspect 3—The system recited in aspect 1, wherein said the optimizer composes of the bandwidth estimator, the latency estimator, the wireless frequency channel optimizer, and the TCP/IP configuration optimizer.

Aspect 4—The system recited in aspect 1, wherein said the post-optimization processing units composes of a performance verification module, the rollback module, and the dynamic re-optimization module.

Aspect 5—The system recited in aspect 1, wherein said the core module works at the runtime for optimizing the ad delivery rate by selecting the most suitable configuration and applies the configuration in all the modules involved.

Aspect 6—A method for optimizing the network latency for the online mobile games in the mobile client, which detects the current network operator, looks up the available wireless frequency channels by operator, profiles the default frequency channel's performance statistics via active probe, profiles all the wireless channels, decide the next optimal channel set and TCP/IP parameters, switches to the optimal frequency channel set and TCP/IP parameters, verifies the success and performance improvement after the optimization (and rollbacks to the default setting otherwise), and performs dynamic re-optimization with network environment changes.

Aspect 7—The method recited in aspect 6, wherein said the passive network monitor enables the cellular modem diagnostic mode, logs the runtime radio-resource-control messages, extracts the channels/RSRQ/RSRQ/RSSI/TDD configuration/carrier aggregation configurations from these messages, and report them to the optimizers.

Aspect 8—The method recited in aspect 6, wherein said the active network probe looks up the game server's IP address, ping/TCPing the gaming server with the same packet size and inter-packet interval as the game app's player control traffic, and reports the average and standard variation of ping/TCPing results to the optimizers.

Aspect 9—The method recited in aspect 6, wherein said the bandwidth estimator profiles all available wireless channels, estimates the radio traffic load, estimates the unallocated physical radio resource blocks, estimates the available wireless bandwidth, calibrates the bandwidth estimation for TDD channels, and report all channels' bandwidth to the optimizer.

Aspect 10—The method recited in aspect 6, wherein said the latency estimator profiles all available wireless channels, assigns latency score for each channel, and report all channels' scores to the optimizer.

Aspect 11—The method recited in aspect 6, wherein said the wireless frequency channel optimizer selects the optimal channel set for the bandwidth-intensive games (e.g., cloud gaming or video gaming) by estimating all channels available wireless bandwidth, selecting the primary channel with highest available bandwidth, locking the client to the primary channel, deciding the available channels that can be combined with the primary channel via carrier aggregation, and enabling these channels if carrier aggregation is supported by the client and network.

Aspect 12—The method recited in aspect 6, wherein said the wireless frequency channel optimizer selects the optimal channel set for the games that do not involve heady network traffic transfer by estimating all channels' end-to-end latency, selecting the primary channel with highest available bandwidth, and locking the client to the primary channel.

Aspect 13—The method recited in aspect 6, wherein said the TCP/IP optimizer dynamically calculates the best suitable TCP read/write memory, buffer size, and IP MTU parameter for the latency and bandwidth requirement.

Aspect 14—The method recited in aspect 6, wherein said the performance verification submodule continuously probing a designated test server to obtain the wireless channel latency performance in the background, and emitting the results to the rollback submodule and the dynamic re-optimization submodule.

Aspect 15—The method recited in aspect 6, wherein said the rollback submodule dynamically and constantly monitors the ping probe results compared to the maximum threshold, and restore the previous working set of parameters, if necessary.

Aspect 16—The method recited in aspect 6, wherein said the dynamic re-optimization submodule constantly monitoring the current optimization result and profile the results in an exponential moving-window average fashion; and its comparison with preset threshold buckets and determination of schedule timer for re-optimization.

Figure 34:
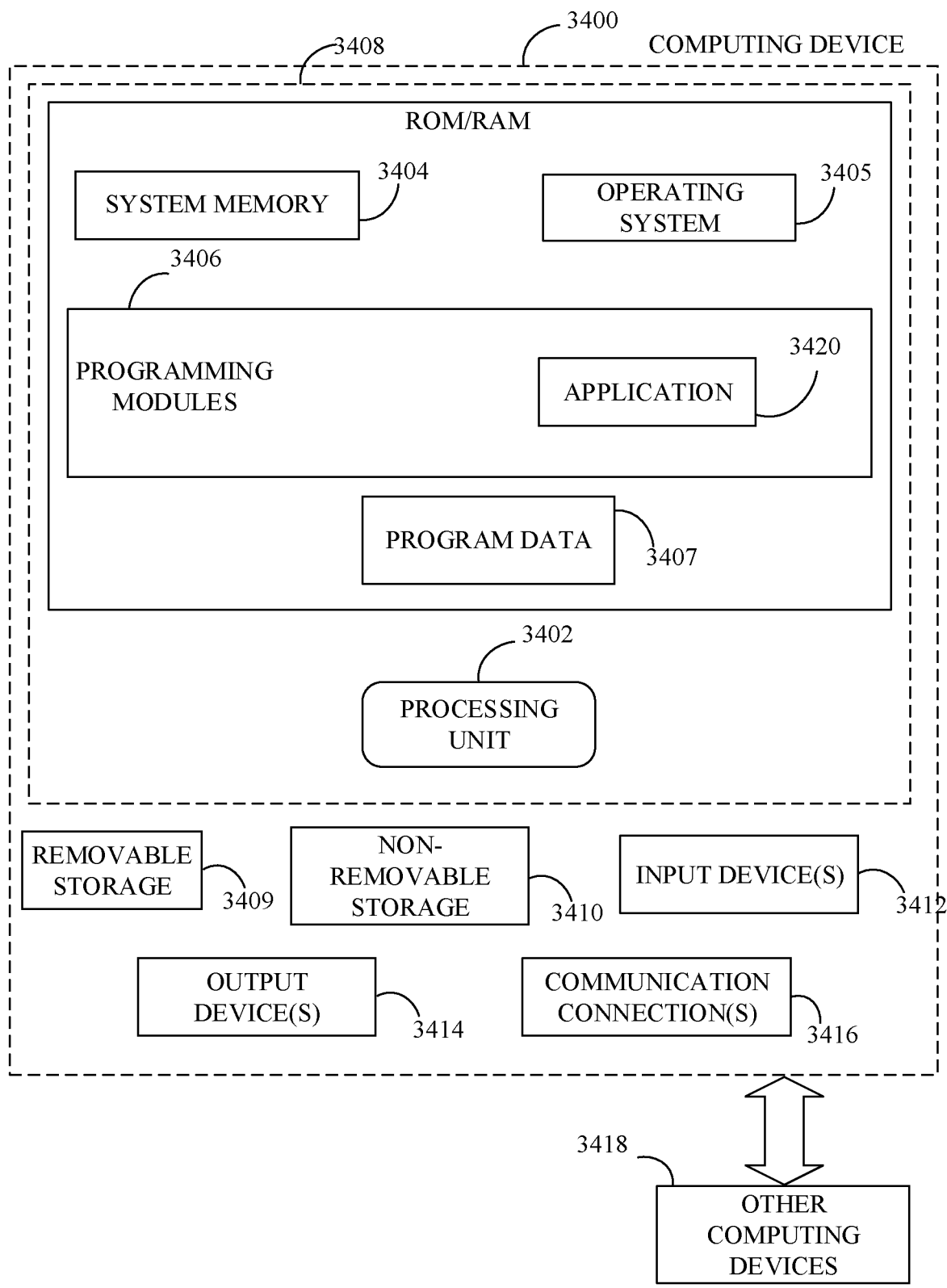
FIG. 34 is a block diagram of a computing device for implementing the methods disclosed herein, in accordance with some embodiments.

With reference to FIG. 34, a system consistent with an embodiment of the disclosure may include a computing device or cloud service, such as computing device 3400. In a basic configuration, computing device 3400 may include at least one processing unit 3402 and a system memory 3404. Depending on the configuration and type of computing device, system memory 3404 may comprise, but is not limited to, volatile (e.g. random-access memory (RAM)), non-volatile (e.g. read-only memory (ROM)), flash memory, or any combination. System memory 3404 may include operating system 3405, one or more programming modules 3406, and may include a program data 3407. Operating system 3405, for example, may be suitable for controlling computing device 3400's operation. In one embodiment, programming modules 3406 may include monitoring module, optimizer module, post-optimization processing module, performance verification module, rollback module, dynamic re-optimization module. Furthermore, embodiments of the disclosure may be practiced in conjunction with a graphics library, other operating systems, or any other application program and is not limited to any particular application or system. This basic configuration is illustrated in FIG. 34 by those components within a dashed line 3408.

Computing device 3400 may have additional features or functionality. For example, computing device 3400 may also include additional data storage devices (removable and/or non-removable) such as, for example, magnetic disks, optical disks, or tape. Such additional storage is illustrated in FIG. 34 by a removable storage 3409 and a non-removable storage 3410. Computer storage media may include volatile and non-volatile, removable and non-removable media implemented in any method or technology for storage of information, such as computer-readable instructions, data structures, program modules, or other data. System memory 3404, removable storage 3409, and non-removable storage 3410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3400. Any such computer storage media may be part of device 3400. Computing device 3400 may also have input device(s) 3412 such as a keyboard, a mouse, a pen, a sound input device, a touch input device, a location sensor, a camera, a biometric sensor, etc. Output device(s) 3414 such as a display, speakers, a printer, etc. may also be included. The aforementioned devices are examples and others may be used.

Computing device 3400 may also contain a communication connection 3416 that may allow device 3400 to communicate with other computing devices 3418, such as over a network in a distributed computing environment, for example, an intranet or the Internet. Communication connection 3416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3404, including operating system 3405. While executing on processing unit 3402, programming modules 3406 (e.g., application 3420) may perform processes including, for example, one or more stages of methods, algorithms, systems, applications, servers, databases as described above. The aforementioned process is an example, and processing unit 3402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A device for facilitating optimizing of a network connection established between the device and one or more servers through at least one network, wherein the device comprises at least one network connection interface configured for establishing the network connection with the one or more servers, wherein the device comprises:
    at least one monitor configured for collecting at least one network information associated with the network connection from the at least one network connection interface; and
    at least one optimizer communicatively coupled with the at least one monitor, wherein the at least one optimizer is configured for:
        profiling each frequency channel of a plurality of frequency channels associated with the at least one network connection interface based on the collecting, wherein the at least one network connection interface establishes the network connection using at least one frequency channel of the plurality of frequency channels and at least one communication layer parameter of at least one communication layer associated with the at least one network connection interface;
        determining at least one optimal frequency channel of the plurality of frequency channels based on the profiling; and
        determining at least one optimal communication layer parameter of the at least one communication layer based on the profiling, wherein the at least one network connection interface is configured for establishing the network connection using the at least one optimal frequency channel and the at least one optimal communication layer parameter;
    wherein the at least one monitor comprises at least one active network probe, wherein the at least one passive network probe is configured for:
    transmitting at least one message to the one or more servers using the at least one network connection interface via at least one ping, wherein each message of the at least one message is characterized by a packet size and an inter-packet interval for emulating an application traffic generated by an application executed on the device, wherein the each message comprises a timestamp;
    receiving at least one echo message from the one or more servers based on the transmitting of the at least one message;
    analyzing the at least one message and the at least one echo message; and
    generating at least one end-to-end latency measurement based on the analyzing; and
    generating at least one of an average of the at least one end-to-end latency measurement and a standard deviation of the at least one end-to-end latency measurement based on the generating of the at least one end-to-end latency measurement, wherein the at least one network information comprises at least one of the at least one end-to-end latency measurement, the at least one of the average of the at least one end-to-end latency measurement, and the standard deviation of the at least one end-to-end latency measurement.

2. The device of claim 1 further comprising at least one post-optimization processing unit communicatively coupled with the at least one optimizer, wherein the at least one post-optimization processing unit is configured for:
    receiving at least one first network performance metric associated with the network connection established using the at least one frequency channel and the at least one communication layer parameter from the at least one network connection interface;
    receiving at least one second network performance metric associated with the network connection established using the at least one optimal frequency channel and the at least one optimal communication layer parameter from the at least one network connection interface;
    analyzing the at least one first network performance metric and the at least one second network performance metric; and
    determining an optimization of the network connection based on the analyzing, wherein the at least one network connection interface is configured for modifying the network connection based on the determining of the optimization.

3. The device of claim 2, wherein the at least one post-optimization processing unit comprises at least one performance verification module, wherein the at least one performance verification module is configured for:
    performing at least one ping for the one or more servers using the at least one network connection interface;
    determining at least one latency corresponding to the at least one ping based on the performing; and
    storing the at least one latency.

4. The device of claim 3, wherein the at least one post-optimization processing unit comprises at least one rollback module communicatively coupled with the at least one performance verification module, wherein the at least one rollback module is configured for:
    analyzing the at least one latency associated with the at least one optimal frequency channel;
    determining a rollback condition for the at least one communication layer based on the analyzing; and
    replacing the at least one optimal communication layer parameter with the at least one communication layer parameter for the at least one communication layer based on the determining, wherein the at least one network connection interface is configured for establishing the network connection using the at least one optimal frequency channel and the at least one communication layer parameter of the at least one communication layer based on the rollback condition.

5. The device of claim 3, wherein the at least one post-optimization processing unit comprises at least one dynamic re-optimization module communicatively coupled with the at least one performance verification module, wherein the at least one dynamic re- optimization module is configured for:
    reading the at least one latency corresponding to the at least one ping, wherein each latency is read after a time interval;
    calculating an exponential moving window average (EMWA) of the at least one latency based on the reading;
    comparing the EMWA with a predetermined latency based on the calculating; and scheduling an optimization task for the at least one optimizer based on the comparing, wherein at least one of the determining of the at least one optimal frequency channel and the determining of the at least one optimal communication layer parameter is based on the scheduling.

6. The device of claim 1, wherein the at least one monitor comprises at least one passive network monitor, wherein the at least one passive network monitor is configured for:
issuing at least one command to at least one virtual device of the device; and
extracting at least one network parameter of the each frequency channel from the at least one virtual device based on the issuing, wherein the at least one network information comprises the at least one network parameter.

7. The device of claim 1, wherein the at least one network information comprises at least one channel information associated with the each frequency channel, wherein the at least one optimizer comprises at least one bandwidth estimator, wherein the at least one bandwidth estimator is configured for:
analyzing at least one channel information;
determining a bandwidth of the each frequency channel based on the analyzing; and
generating a bandwidth index for the each frequency channel based on the determining, wherein at least one of the determining of the at least one optimal frequency channel and the determining of the at least one optimal communication layer parameter is based on the generating.

8. The device of claim 7, wherein the at least one network information comprises at least one application information associated with at least one application executed on the device, wherein the at least one optimizer comprises at least one frequency channel optimizer, wherein the at least one frequency channel optimizer is configured for:
analyzing the at least one application information;
determining at least one bandwidth requirement for the at least one application based on the analyzing; and
selecting at least one primary frequency channel of the plurality of frequency channels based on the determining of the at least one bandwidth requirement, wherein each primary frequency channel of the at least one primary frequency channel is characterized by the bandwidth index, wherein the determining of the at least one optimal frequency channel is based on the selecting.

9. The device of claim 1, wherein the at least one network information comprises at least channel measurement associated with the each frequency channel, wherein the at least one optimizer comprises at least one latency estimator, wherein the at least one latency estimator is configured for:
analyzing the at least one channel measurement;
determining a latency associated with the each frequency channel based on the analyzing; and
generating a latency score for the each frequency channel based on the determining, wherein at least one of the determining of the at least one optimal frequency channel and the determining of the at least one optimal communication layer parameter is based on the generating.

10. The device of claim 9, wherein the at least one network information comprises at least one application information associated with at least one application executed on the device, wherein the at least one optimizer comprises at least one frequency channel optimizer, wherein the at least one frequency channel optimizer is configured for:
analyzing the at least one application information;
determining at least one latency requirement for the at least one application based on the analyzing; and
selecting at least one primary frequency channel of the plurality of frequency channels based on the determining of the at least one latency requirement, wherein each primary frequency channel of the at least one primary frequency channel is characterized by the latency score, wherein the determining of the at least one optimal frequency channel is based on the selecting.

11. The device of claim 1, wherein the profiling comprises estimating at least one of a bandwidth and a latency for the each frequency channel of the plurality of frequency channels.

12. The device of claim 11, wherein the at least one optimizer comprises at least one communication layer optimizer, wherein the at least one communication layer optimizer is configured for:
analyzing the bandwidth associated with the each frequency channel and the latency associated with the each frequency channel; and
configuring the at least one communication layer parameter based on the analyzing, wherein the determining of the at least one optimal communication layer parameter of the at least one communication layer is based on the configuring.

13. A device for facilitating optimizing of a network connection established between the device and one or more servers through at least one network, wherein the device comprises at least one network connection interface configured for establishing the network connection with the one or more servers, wherein the device comprises:
at least one monitor configured for collecting at least one network information associated with the network connection from the at least one network connection interface;
at least one optimizer communicatively coupled with the at least one monitor, wherein the at least one optimizer is configured for:
profiling each frequency channel of a plurality of frequency channels associated with the at least one network connection interface based on the collecting, wherein the at least one network connection interface establishes the network connection using at least one frequency channel of the plurality of frequency channels and at least one communication layer parameter of at least one communication layer associated with the at least one network connection interface;
determining at least one optimal frequency channel of the plurality of frequency channels based on the profiling;
determining at least one optimal communication layer parameter of the at least one communication layer based on the profiling, wherein the at least one network connection interface is configured for establishing the network connection using the at least one optimal frequency channel and the at least one optimal communication layer parameter; and
at least one post-optimization processing unit communicatively coupled with the at least one optimizer, wherein the at least one post-optimization processing unit is configured for:

receiving at least one first network performance metric associated with the network connection established using the at least one frequency channel and the at least one communication layer parameter from the at least one network connection interface;

receiving at least one second network performance metric associated with the network connection established using the at least one optimal frequency channel and the at least one optimal communication layer parameter from the at least one network connection interface;

analyzing the at least one first network performance metric and the at least one second network performance metric; and determining an optimization of the network connection based on the analyzing, wherein the at least one network connection interface is configured for modifying the network connection based on the determining of the optimization;

wherein the at least one monitor comprises at least one active network probe, wherein the at least one active network probe is configured for:

transmitting at least one message to the one or more servers using the at least one network connection interface via at least one ping, wherein each message of the at least one message is characterized by a packet size and an inter-packet interval for emulating an application traffic generated by an application executed on the device, wherein the each message comprises a timestamp;

receiving at least one echo message from the one or more servers based on the transmitting of the at least one message;

analyzing the at least one message and the at least one echo message;

generating at least one end-to-end latency measurement based on the analyzing; and generating at least one of an average of the at least one end-to-end latency measurement and a standard deviation of the at least one end-to-end latency measurement based on the generating of the at least one end-to-end latency measurement, wherein the at least one network information comprises at least one of the at least one end-to-end latency measurement, the at least one of the average of the at least one end-to-end latency measurement, and the standard deviation of the at least one end-to-end latency measurement.

14. The device of claim 13, wherein the at least one post-optimization processing unit comprises at least one performance verification module, wherein the at least one performance verification module is configured for:

performing at least one ping for the one or more servers using the at least one network connection interface;

determining at least one latency corresponding to the at least one ping based on the performing; and storing the at least one latency.

15. The device of claim 13, wherein the at least one monitor comprises at least one passive network monitor, wherein the at least one passive network monitor is configured for:

issuing at least one command to at least one virtual device of the device; and extracting at least one network parameter of the each frequency channel from the at least one virtual device based on the issuing, wherein the at least one network information comprises the at least one network parameter.

16. The device of claim 13, wherein the at least one network information comprises at least one channel information associated with the each frequency channel, wherein the at least one optimizer comprises at least one bandwidth estimator, wherein the at least one bandwidth estimator is configured for:

analyzing at least one channel information;

determining a bandwidth of the each frequency channel based on the analyzing; and generating a bandwidth index for the each frequency channel based on the determining, wherein at least one of the determining of the at least one optimal frequency channel and the determining of the at least one optimal communication layer parameter is based on the generating.

17. The device of claim 13, wherein the at least one network information comprises at least channel measurement associated with the each frequency channel, wherein the at least one optimizer comprises at least one latency estimator, wherein the at least one latency estimator is configured for:

analyzing the at least one channel measurement;

determining a latency associated with the each frequency channel based on the analyzing; and generating a latency score for the each frequency channel based on the determining, wherein at least one of the determining of the at least one optimal frequency channel is based on the generating and the determining of the at least one optimal communication layer parameter is based on the generating.

18. The device of claim 13, wherein the profiling comprises estimating at least one of a bandwidth and a latency for the each frequency channel of the plurality of frequency channels.

* * * * *